(12) United States Patent
Raith

(10) Patent No.: US 6,498,936 B1
(45) Date of Patent: Dec. 24, 2002

(54) METHODS AND SYSTEMS FOR CODING OF BROADCAST MESSAGES

(75) Inventor: Alex Krister Raith, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/235,469

(22) Filed: Jan. 22, 1999

(51) Int. Cl.$^7$ ................................. H04Q 7/20
(52) U.S. Cl. ...................... 455/466; 714/746; 714/786; 370/337
(58) Field of Search ................ 370/312, 390, 370/432; 340/744; 455/466, 515; 714/752, 753, 758, 779, 746, 786

(56) References Cited

U.S. PATENT DOCUMENTS

| | | | |
|---|---|---|---|
| 5,404,355 A | 4/1995 | Raith | 370/95.1 |
| 5,570,369 A * | 10/1996 | Jokinen | 340/7.34 |
| 5,603,081 A | 2/1997 | Raith et al. | 455/33.1 |
| 5,717,689 A * | 2/1998 | Ayanoglu | 370/349 |
| 5,751,731 A | 5/1998 | Raith | 371/37.01 |
| 5,768,276 A | 6/1998 | Diachina et al. | 370/432 |
| 6,199,190 B1 * | 3/2001 | Wan | 714/758 |
| 6,275,480 B1 * | 8/2001 | Schreier | 370/321 |
| 6,349,207 B1 * | 2/2002 | Monot et al. | 455/423 |

FOREIGN PATENT DOCUMENTS

| | | | |
|---|---|---|---|
| WO | WO 97/33402 | 9/1997 | |
| WO | WO 98/10605 | 3/1998 | H04Q/7/22 |
| WO | WO 98/54866 | 12/1998 | H04L/1/00 |

OTHER PUBLICATIONS

U.S. patent application Ser. No. 09/132,232, Raith, filed Aug. 11, 1998.

U.S. patent application Ser. No. 09/114,350, Raith, filed Jul. 13, 1998.

U.S. patent application Ser. No. 09/113,317, Raith, filed Jul. 10, 1998.

U.S. patent application Ser. No. 08/544,492, Raith et al., filed Oct. 18, 1995.

* cited by examiner

*Primary Examiner*—Thanh Cong Le
*Assistant Examiner*—Nick Corsaro
(74) *Attorney, Agent, or Firm*—Myers Bigel Sibley & Sajovec

(57) ABSTRACT

A message is wirelessly broadcast to wireless terminals by error correction coding the message to produce an error correction coded message block, dividing the error correction coded message block into frames and error correction coding the frames to produce error correction coded frames. The error correction coding frames are wirelessly broadcast to the wireless terminals. At the wireless terminals, the frames are received and the frames are error correction decoded to produce error correction decoded frames. The error correction decoded frames are combined into a message block, and the message block is error correction decoded to produce the message. By error correction coding the entire message in addition to error correction coding the frames of the message, long messages may be reliably broadcast and received, notwithstanding fading and other problems in the transmission. Accordingly, a broadcast channel that is designed for short message usage also may be used to reliably transmit long messages. The invention may, for example, be applicable to a TDMA system that includes a Digital Control CHannel (DCCH) having a short message Service Broadcast Control CHannel (S-BCCH) logical channel. The error correction coded frames are placed in the S-BCCH logical channel. The S-BCCH logical channel is then wirelessly broadcast to the radiotelephones in a plurality of TDMA time slots.

43 Claims, 19 Drawing Sheets

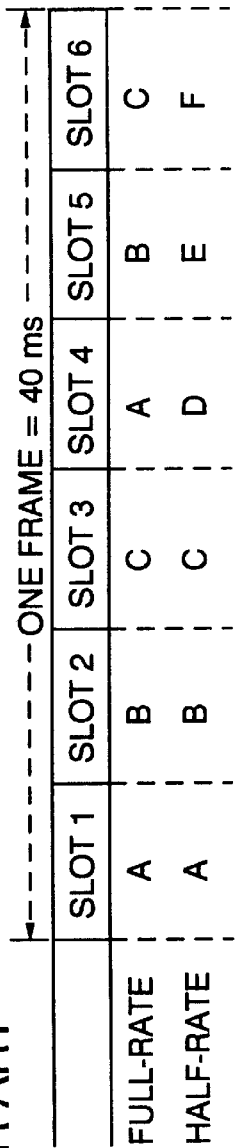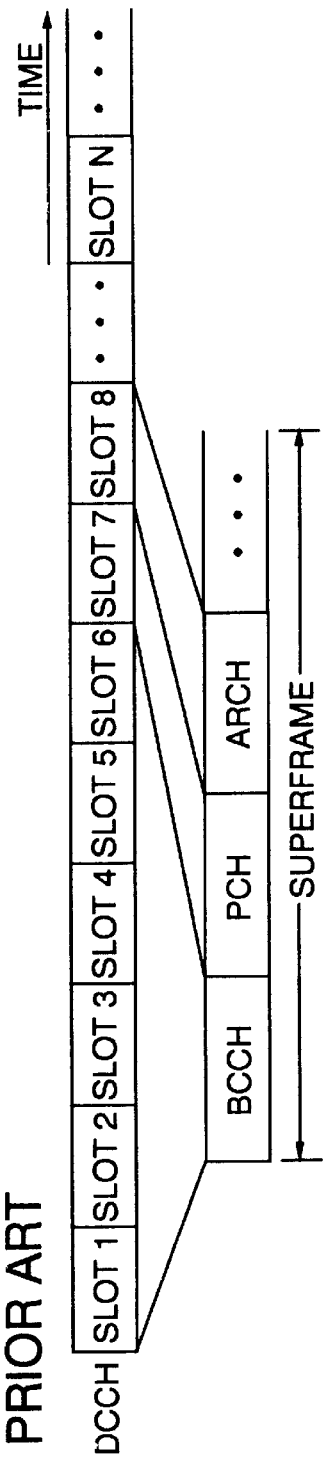
FIG. 2 PRIOR ART
FIG. 3 PRIOR ART
FIG. 5
FIG. 7

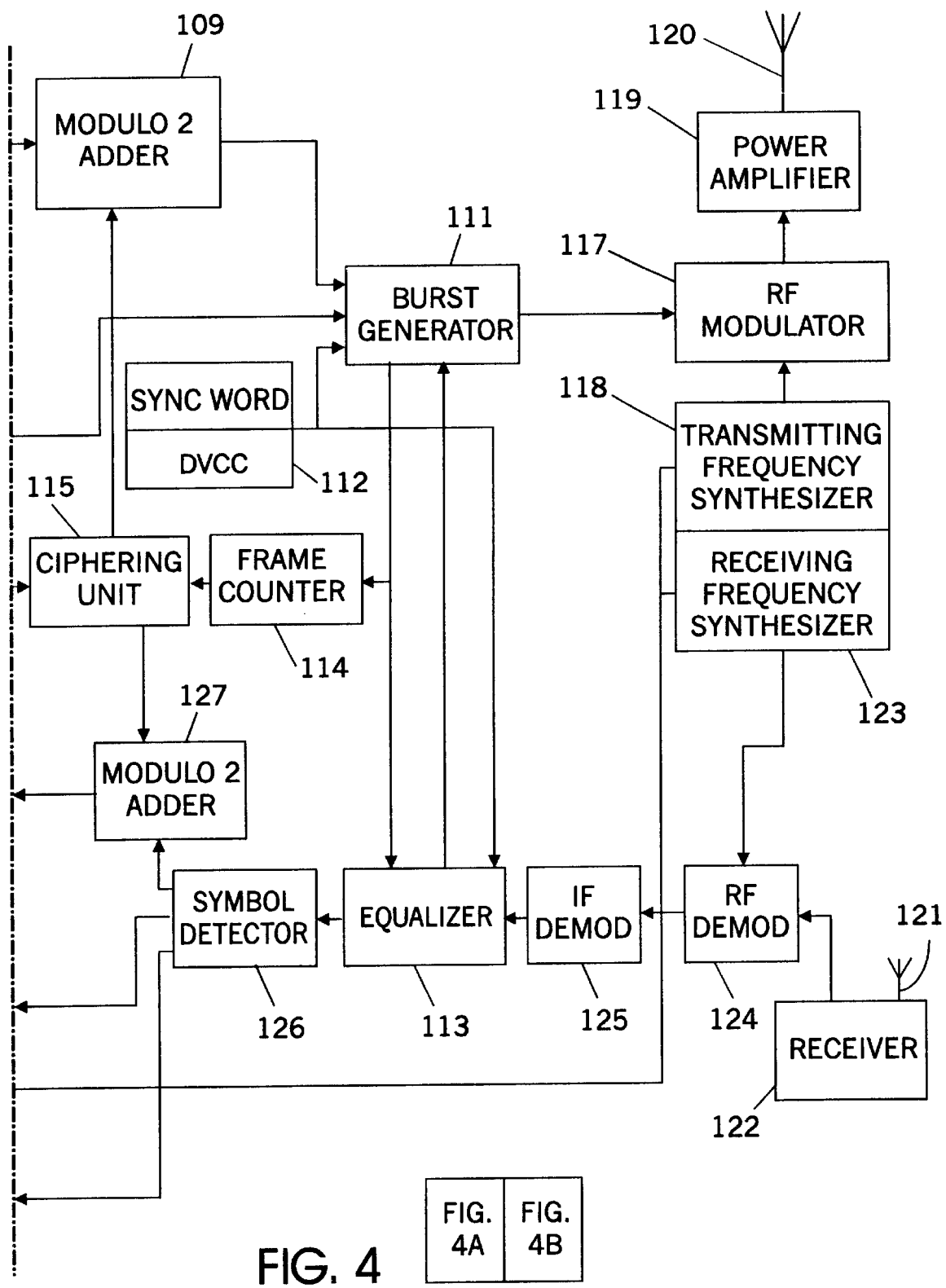

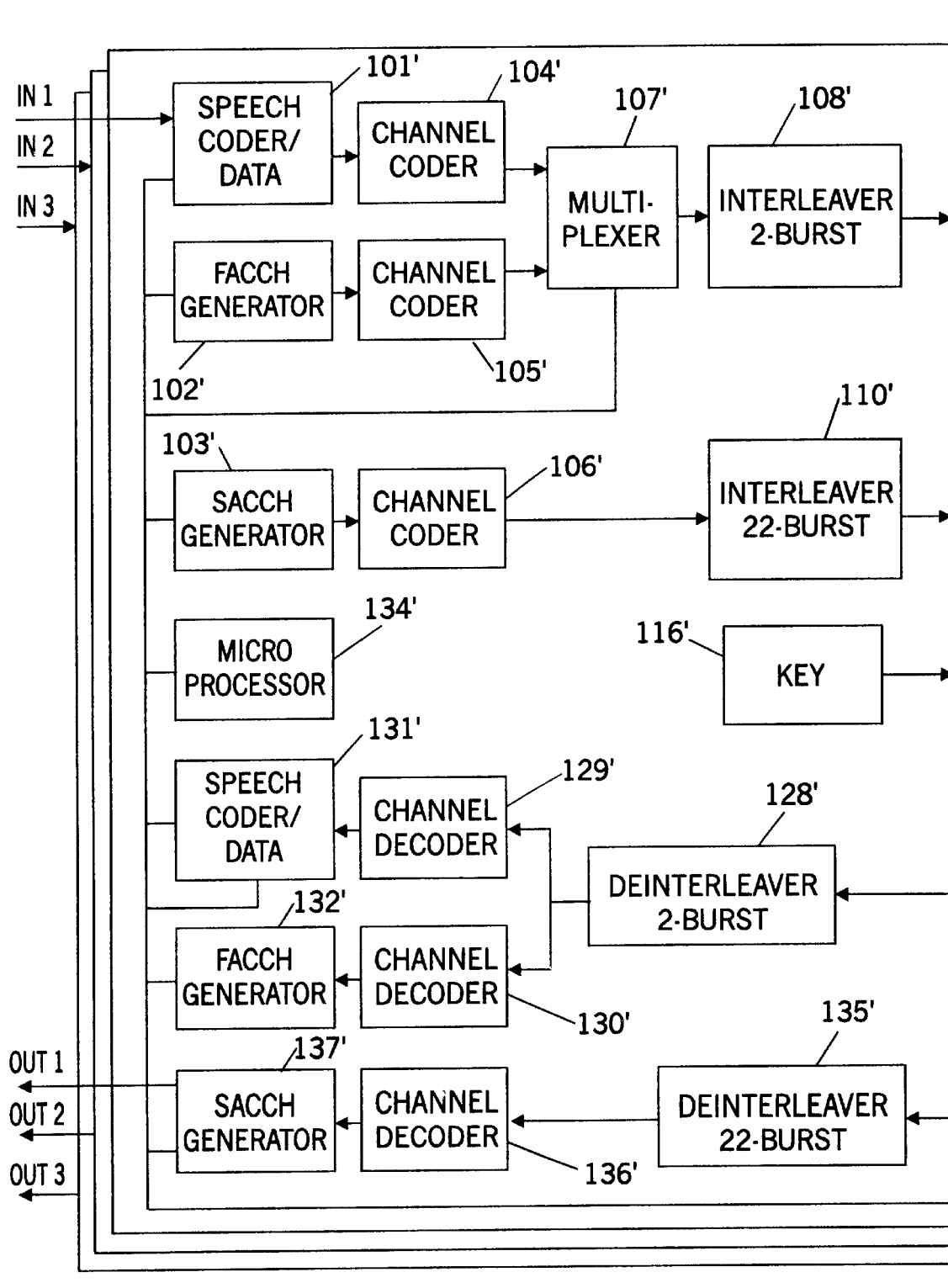

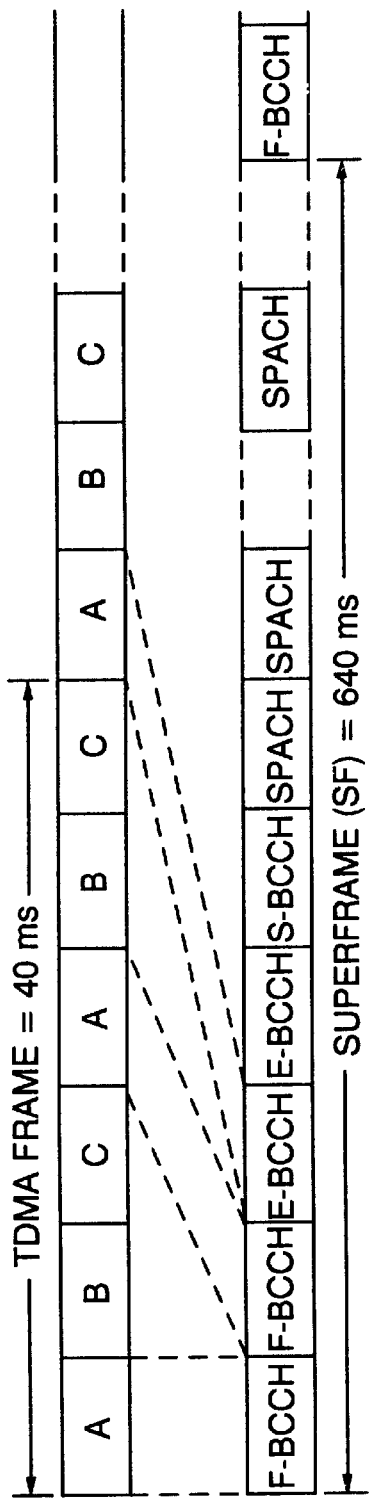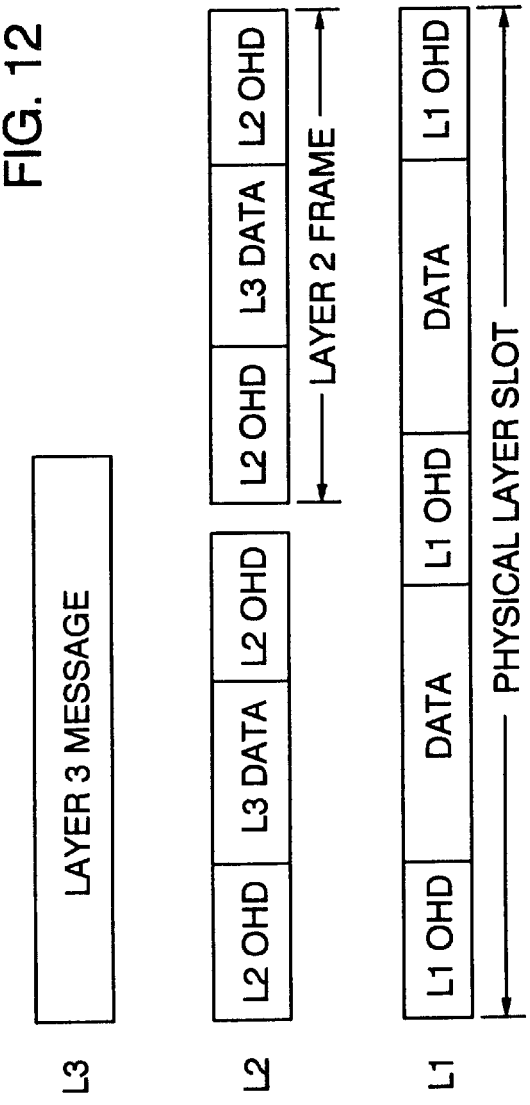

FIG. 15
Hyperframe Structure
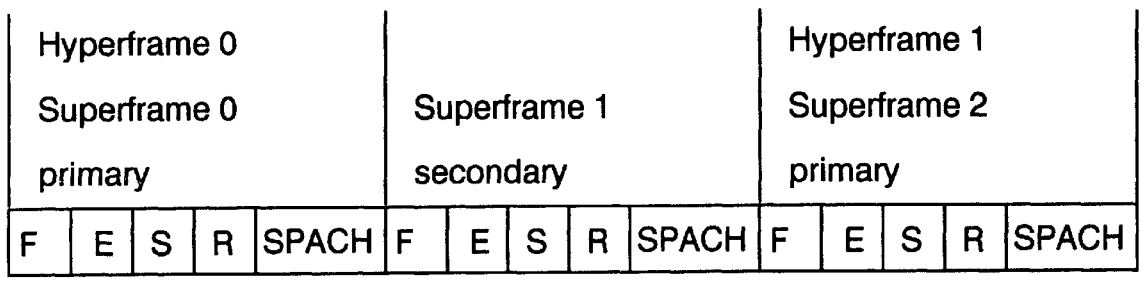
FIG. 16
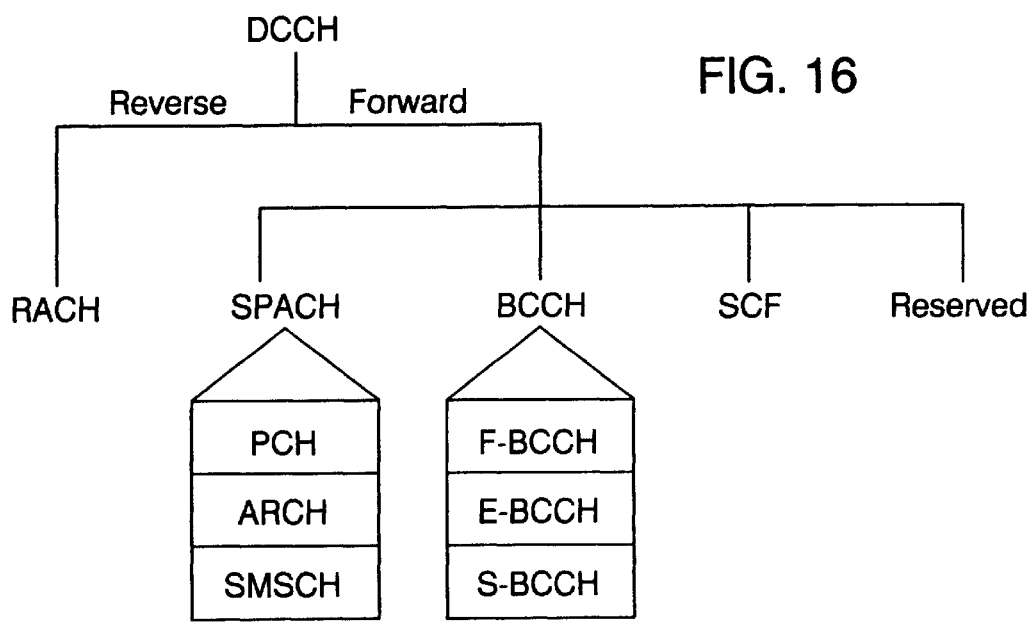
FIG. 18
| SCID | FT | FSN | L3LI | L3 DATA | CRC |
|------|----|----|------|---------|-----|
| 5 | 2 | 10 | 8 | 84 | 16 |

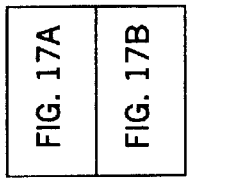
FIG. 17
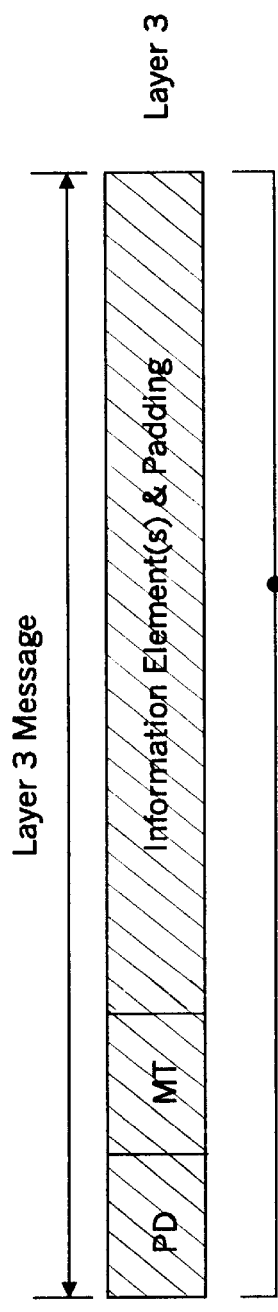
FIG. 17A
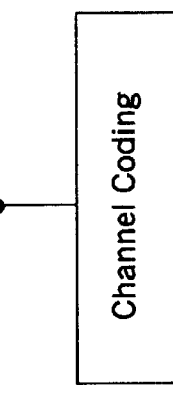
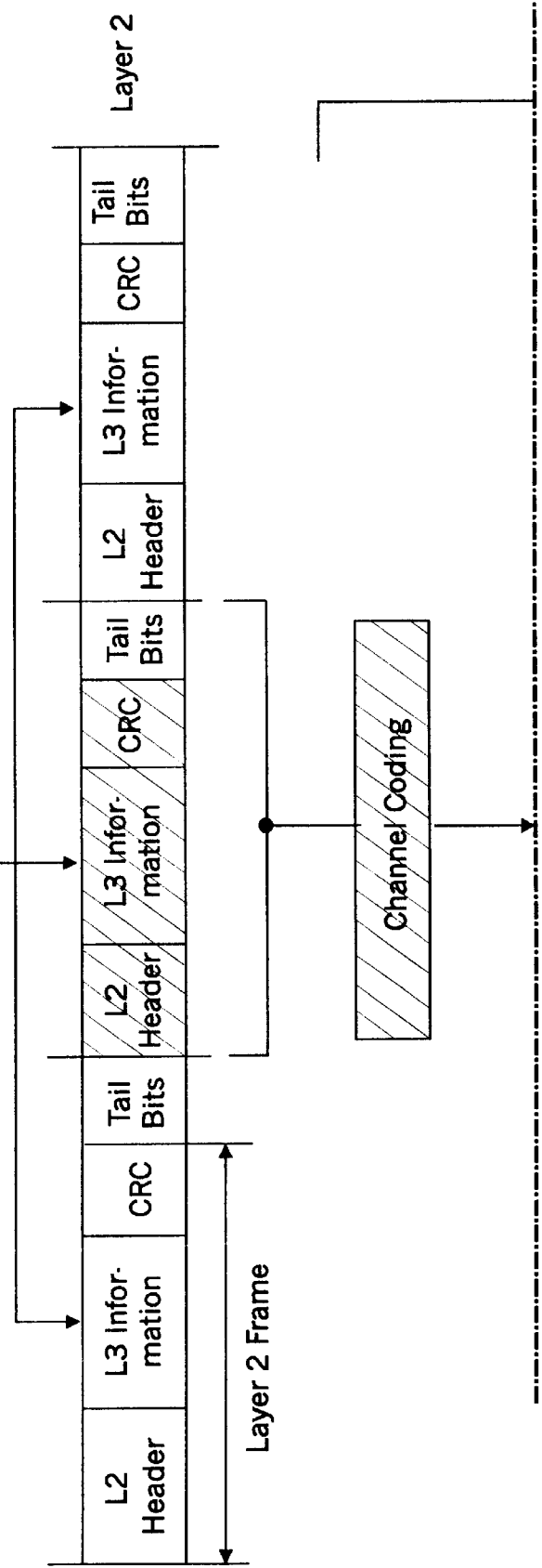

FIG. 19

| SCID | FT | FSN | L3 DATA | CRC |
|---|---|---|---|---|
| 5 | 2 | 10 | 92 | 16 |

FIG. 20

| SCID | FT | FSN | MO | L3 DATA | L3LI | L3 DATA | CRC |
|---|---|---|---|---|---|---|---|
| 5 | 2 | 10 | 7 | L1 | 8 | 77-L1 | 16 |

CRM vs WER, no coding

CRM vs WER, 1 redundancy frame

CRM vs WER, 2 redundancy frames

No of net L2 frames

FIG. 25

Proposed Superframe Structure

| primary | F | F | E | E | E | S1 | S1 | S1 | S2 | S2 | S2 | R2 | SPACH |
|---|---|---|---|---|---|---|---|---|---|---|---|---|---|

Superframe 0

Hyperframe 0

FIG. 26

| slot 1 | slot 2 | slot 3 | slot 4 | slot 5 | slot 6 |
|---|---|---|---|---|---|
| DCCH/Master | DCCH/Slave | TCH 1 | DCCH/Master | TCH 2 | TCH 1 |

FIG. 27

| slot 1 | slot 2 | slot 3 | slot 4 | slot 5 | slot 6 |
|---|---|---|---|---|---|
| DCCH/Master | DCCH/Slave1 | DCCH/Slave2 | DCCH/Master | DCCH/Slave1 | DCCH/Slave2 |

METHODS AND SYSTEMS FOR CODING OF BROADCAST MESSAGES

FIELD OF THE INVENTION

This invention relates to methods and systems for radio communications, and more particularly to methods and systems for wirelessly broadcasting messages to wireless terminals such as radiotelephones.

BACKGROUND OF THE INVENTION

Commercial radio communications are widely used for voice and/or data communications. Pagers and cellular phones, in particular, have become relatively common. These two different types of communication devices, and supporting systems, have evolved from different fundamental purposes. In particular, pagers traditionally provide one-way, limited information to one or more end users and cellular phones traditionally provide two-way voice communication service.

As time and technology progress, the traditional functional dividing lines between these two different types of radio communication devices have become blurred. Pagers have acquired some of the functionality that was traditionally provided by cellular phones and vice-versa. For example, two-way pagers have been developed which permit the pager user to transmit messages to the paging system, which messages can then be forwarded to other parties. Similarly, cellular phones have acquired the capability to transmit and receive short (e.g., on the order of 160 alphanumeric character) text messages which can be output on the display of a cellular phone.

This evolution in radio communication devices has led to the development and marketing of a host of new information services. For example, paging systems have been implemented which provide for the broadcast of information services, e.g., stock quote information services, to a large number of subscribers that have pagers with displays. These pagers periodically receive information over an air interface associated with a large number of stocks or other financial instruments such as options, futures. etc., and display the current prices of these instruments so that a user can track a portfolio's performance.

Users of cellular phones may have interest in the provision of a similar service which would provide information service support in a cellular network. However, cellular systems, unlike paging systems, have conventionally been designed around the paradigms of (1) limited bandwidth due to a restriction on the spectrum allocated by various governing bodies such as the FCC for cellular applications and (2) the notion that most of the limited bandwidth should be reserved for point-to-point connections such as voice connection between the cellular phones and the system, with only a relatively small fraction being reserved for broadcast (point-to-multipoint) transmissions from the system to the cellular phones operating in the system. Due to this latter feature of cellular systems in particular, system designers generally are very careful regarding the amount of information transmitted on the available broadcast channels and the frequency with which this information is repeated. Thus, the provision of broadcast information services to cellular radio communication systems may not readily be accomplished by the most straightforward approach of broadcasting whatever information is desired for all subscribers to display on their cellular phones.

For example, in a Time Division Multiple Access (TDMA) cellular radiotelephone system, each radio frequency is divided into a series of time slots, each of which contains a burst of information from a data source, e.g., a digitally encoded portion of a voice conversation. By time multiplexing bursts associated with different sources, more than one channel can be supported on each radio frequency. The time slots are grouped into successive TDMA frames having a predetermined duration. The number of time slots in each TDMA frame is related to the number of different users that can simultaneously share the radio channel. If each slot in a T DMA frame is assigned to a different user, the duration of a TDMA frame is the minimum amount of time between successive time slots assigned to the same user.

The successive time slots assigned to the same user, which are usually not consecutive time slots on the radio carrier, constitute the user's Digital Traffic Channel (DTC). As mentioned above, this is typically a point-to-point resource. In fact, TDMA systems generally reserve the majority of the available radio channels for use as DTCs to ensure a large traffic capacity. However, as described in more detail below, Digital Control CHannels (DCCHs) are also provided for communicating control signals and overhead information, including a mechanism for connecting to the radio communication system and being assigned a DTC.

Similar types of resource allocations are found in other types of cellular systems. For example, in Code Division Multiple Access (CDMA) systems, channelization is performed by spreading data associated with a particular connection using a unique spreading code. This code, as opposed to or in conjunction with frequency and time differentiators, provides the receiver with a mechanism for extracting its intended data, by correlating the received composite signal with the code assigned to its traffic channel. Like TDMA systems, CDMA systems can also provide for broadcast control channels or other overhead signaling channels by allocating known codes thereto. However, like TDMA systems, CDMA systems also tend to reserve more resources, such as codes and power, for dedicated traffic channels than for broadcast information channels. Accordingly, it would be desirable to provide methods and systems which are able to provide broadcast information services within the constraints of existing cellular radio communication systems. In particular, it would be desirable to design broadcast information methods and systems that can accommodate an end user's desire for a relatively large quantity of data that may need to be updated relatively frequently, while reducing and preferably minimizing the usage of scarce broadcast channel resources.

GSM systems presently can offer broadcast services. ANSI 136 has defined a broadcast channel that provides enhanced flexibility with respect to bandwidth allocation, sub-channelization, content description and change notification. However, broadcast services may not be extensively used in the future for the ANSI 136 or ANSI 95 technologies.

Packet data communication, a point-to-point form of communication, may provide access to the same services. Packet data communication, using for example GPRS as will be the supported in both GSM and ANSI 136, are being elaborated in the standards setting groups and resources are being assigned to the development of such products by vendors. Thus, the user may use a packet data service to access an Internet-based stock quote service in which the user's portfolio is downloaded to a wireless terminal upon request by the user. Using a broadcast service, all the securities, possibly limited to a subset of all available securities in interest of bandwidth limitation, are sent on a broadcast channel. The wireless terminal continually or as a result of a user request reads the entire set of securities on the broadcast channel and further manipulation of the data. For example, extraction of the data for presentation as defined by the specific user's portfolio may take place in the mobile station or in a companion lap-top computer.

Wireless packet data systems are now being developed and being made available. This is amplified by the ITU initiated development of "3:e generation" wireless systems. A focus of this activity is to provide a packet data services as efficiently as possible with bit-rates of 144 kbit/s, 384 kbit/s and 2 Mbit/s depending on the environment. To provide wireless packet data, the operators may only need to obtain the necessary equipment and then the user can access the Internet or a corporate mail system. However, the operator may then only provide a wireless bit-pipe but no content. The content provider may be the same companies that provides content in the wireline environment. A current trend in the Internet is for these companies to try to establish themselves as Internet "portals" for as many users as possible. The portals, or entry points to the world wide web, generate revenue by providing advertisements on their sites.

It may be difficult for wireless operators to extend beyond providing connectivity to the existing and ever increasing Internet-based content provider. There are several reasons for the possible inability of the wireless operators to provide connectivity but not provide very much content. The development of broadcast services may require the operators to assign resources for the definition and specification of the services. For the example of the stock quote service, an additional step of translating the format and content from the data source into the format of the broadcast channel may be necessary. Charging mechanisms and associated content access control may need to be developed in order to generate revenue for the operators. A method for access control of broadcast services is disclosed in application Ser. No. 09/132,232, to the present inventor, filed Aug. 11, 1998, and assigned to the assignee of the present application, the disclosure of which is hereby incorporated herein by reference in its entirety.

However, providing a broadcast channel with stock quotes, sport results, weather reports etc. could provide an increased revenue stream for the wireless operator. Furthermore, a broadcast channel need not use up-link communication. The required bandwidth can be independent of the number of users and user request of the information whereas for the packet data scenario the bandwidth used generally is proportional to these two variables. Thus, for services that are widely subscribed to, a broadcast service may be more spectrum efficient then having all users make individual accesses to get information such as their stock portfolios.

If there are very few users subscribing to a service a packet data solution may be more efficient. Applications can be built which use a combination of broadcast and point-to-point service that can allow better control of bandwidth usage than only using one of the type of channels. For example, application Ser. No. 09/114,350, to the present inventor, filed Jul. 13, 1998, and assigned to the assignee of the present application, discloses a "headline news" service which is broadcast and the content is hyperlinked to more detailed information located in a service server. When the user selects an item or topic, the mobile station generates a point-to-point communication to the service server which may be a world wide web site or the detailed content may be downloaded to the mobile station. Thus, broadcast services may allow the operators to receive revenue for value added services and may be more efficiently, provided than packet data services.

SUMMARY OF THE INVENTION

It is therefore an object of the present invention to provide improved methods and systems for wirelessly broadcasting messages to wireless terminals.

It is another object of the present invention to provide systems and methods for wirelessly broadcasting messages to a plurality of radiotelephones in a cellular system.

It is still another object of the present invention to provide systems and methods that can allow relatively long messages to be broadcast over wireless communication systems having relatively short message service capability.

These and other objects are provided, according to the present invention, by systems and methods that wirelessly broadcast a message to a plurality of wireless terminals by error correction coding the message to produce an error correction coded message block, dividing the error correction coded message block into a plurality of frames and error correction coding the frames to produce a plurality of error correction coded frames. The plurality of error correction coding frames are wirelessly broadcast to the plurality of wireless terminals. At the wireless terminals, the plurality of frames are received and the frames are error correction decoded to produce a plurality of error correction decoded frames. The plurality of error correction decoded frames are combined into a message block, and the message block is error correction decoded to produce the message.

It has been found, according to the present invention, that by error correction coding the entire message in addition to error correction coding the frames of the message, long messages may be reliably broadcast and received, notwithstanding fading and other problems in the transmission. Accordingly, a broadcast channel that is designed for short message usage also may be used to reliably transmit long messages.

In a preferred embodiment of the present invention, the frames are also error detection coded in addition to error correction coded. Preferably, the message is error correction coded using block coding, and the frames are convolutionally coded.

In order to provide systems and methods that are compatible with existing short message service systems and methods, an indication is provided that the error correction coded message block is error corrected. The indication may be provided within the error correction coded message block, or outside the error correction coded message block. Preferably, an indication of at least one of the type of error correction coding and the amount of error correction coding in the error coded message block is provided. Moreover, the message is preferably wirelessly broadcast for multiple cycles, and an indication is also preferably provided of the number of cycles of retransmission and an identification of the current cycle number.

The invention may, for example, be applicable to a TDMA system that includes a Digital Control CHannel (DCCH) having a short message Service Broadcast Control CHannel (S-BCCH) logical channel. The message is error correction coded to produce an error correction coded message block and the error correction coded message block is divided into a plurality of frames. The frames are error correction coded to produce a plurality of error correction coded frames. The plurality of error correction coded frames are then placed in the S-BCCH logical channel. The S-BCCH logical channel is then wirelessly broadcast to the plurality of radiotelephones in a plurality of TDMA time slots.

At the TDMA wireless terminals, the plurality of TDMA frames including the DCCH are wirelessly received. At least a portion of the S-BCCH in the DCCH is error correction decoded to produce a plurality of error correction decoded frames. The plurality of error correction decoded frames are combined into a message block, and the message block is error correction decoded to produce the message.

As described above, an indication is preferably provided that the message is error correction coded. The indication may be provided within the S-BCCH or outside the S-BCCH. Preferably, the DCCH includes a Message Type (MT) field and the indication is provided implicitly in the MT field. Alternatively, the indication may be provided explicitly in another field. In another alternative, the message includes a Fast-BCCH (F-BCCH) and an Extended-BCCH (E-BCCH). The indication is provided in the F-BCCH or the E-BCCH, that at least one message in the S-BCCH is error correction coded.

In a TDMA system, the error correction coding of the message is preferably performed by block coding, and the error correction coding of the frames is preferably provided by convolutional coding. The frames may be convolutionally coded at less than rate ½ convolutional coding, due to the added coding that is provided in the message block. At the TDMA wireless terminal, error correction decoding at least a portion of the S-BCCH in the DCCH is performed in response to receiving an indication that at least a portion of the S-BCCH is error correction coded. As described above, the indication may be provided within or outside the S-BCCH. Accordingly, robust broadcast of relatively long messages may be provided in wireless communications systems having relatively short message service capability.

BRIEF DESCRIPTION OF THE DRAWINGS

FIG. 2 shows the structure of a Time Division Multiplexed (TDM) Radio Frequency (RF) channel according to IS-136, a known industry standard;

FIG. 3 shows an exemplary structure for a superframe of a Digital Control CHannel (DCCH) defined over the TDM RF channel shown in FIG. 2;

FIG. 5 shows an IS-136 slot format for Time Division Multiple Access (TDMA) transmissions from the wireless terminal of FIG. 4;

FIG. 7 shows an IS-136 slot format for TDM transmissions from the base station of FIG. 6;

FIG. 11 shows a structure of a superframe defined over the slots of the IS-136 DCCH;

FIG. 12 shows a mapping of Layer 3 (L3) messages into TDM/TDMA slots in accordance with IS-136;

FIG. 15 illustrates Super and hyperframes of a DCCH for the ANSI 136 standard;

FIG. 16 illustrates logical channels on the Digital Control CHannel (DCCH) of the ANSI 136 standard;

FIG. 18 illustrates a Begin frame of the broadcast channel of the ANSI 136 standard;

FIG. 19 illustrates a Continue frame of the broadcast channel of the ANSI 136 standard;

FIG. 20 illustrates a Transition frame of the broadcast channel of the ANSI 136 standard;

FIG. 25 illustrates a proposed new superframe structure that can be used to implement the present invention;

FIG. 26 shows a Master/Slave DCCH implementation for ANSI 136, according to the invention;

FIG. 27 shows a Master and two Slave DCCHs according to the invention;

DETAILED DESCRIPTION OF PREFERRED EMBODIMENTS

Figure 1:
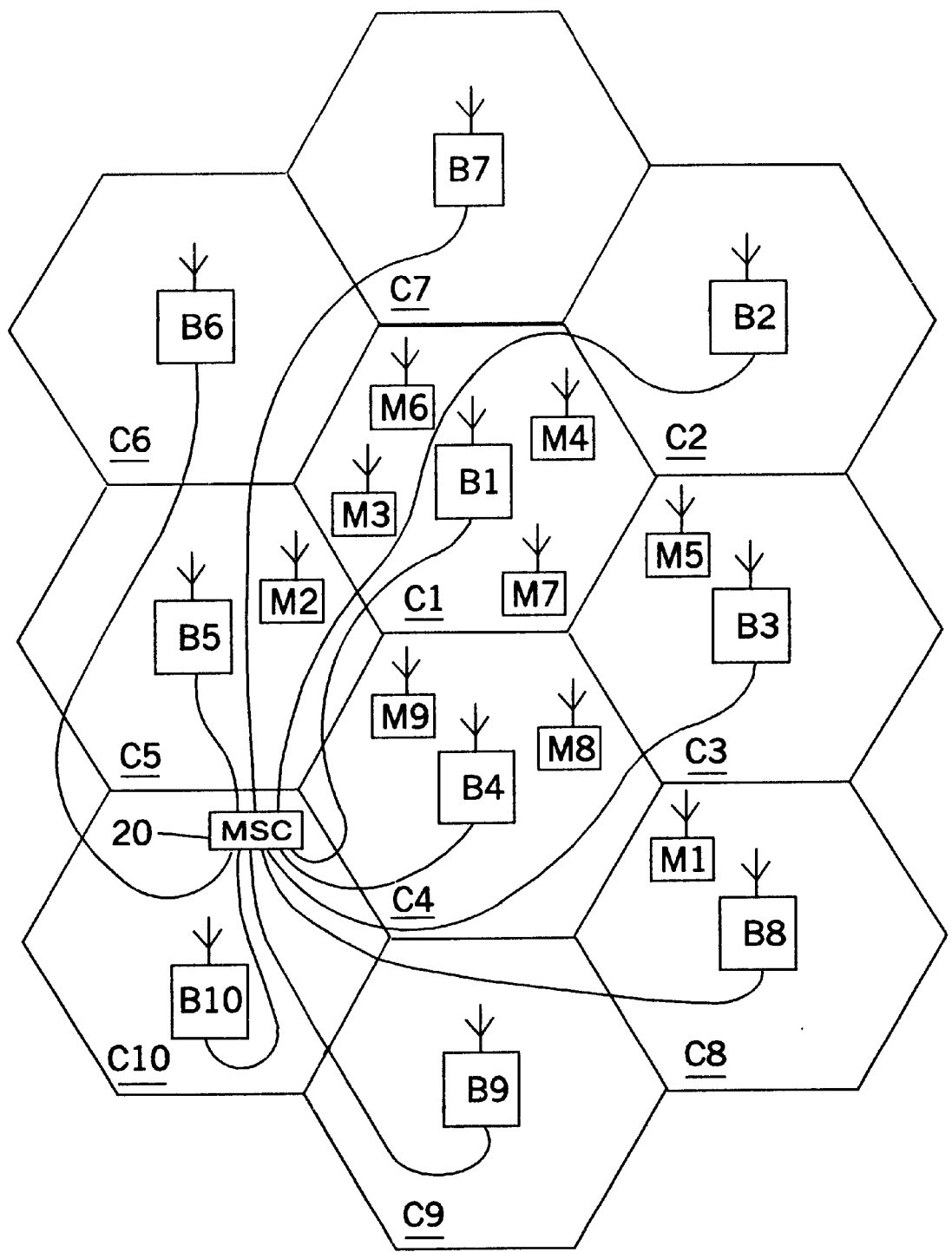
FIG. 1 shows an architecture of a conventional cellular radiotelephone system.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout.

Introduction

The present invention can provide methods and systems that can support broadcast information services via radio communication systems using a broadcast resource in an efficient manner. The end user's equipment, referred to herein as a "wireless terminal", a "receiver" or a "mobile station" may be a receive-only device, including a pager, or may be a receive/transmit device, such as a radiotelephone. It will be understood by those having skill in the art that the terms "wireless terminal", "receiver" and "mobile station" include analog and digital radiotelephones, multiple mode radiotelephones, high function Personal Communications Systems (PCS) devices that may include large displays, scanners, full size keyboards and the like, wireless Personal Digital Assistants (PDA) and other devices, such as personal computers that are equipped with wireless modems.

The present invention can reduce and preferably minimize the capacity of the broadcast resource for a given quality of service that is consumed by the broadcast information service by providing efficient encoding of the transmitted information. Furthermore, the present invention can reduce and preferably minimize the time for a wireless terminal to acquire a broadcast service subject to poor radio channel conditions.

According to a purely illustrative, exemplary embodiment of the present invention, the broadcast information service can be a security (stock) quote service which is provided in an IS-136 compliant system having broadcast Short-Message-Service (SMS) capability. Assume that the scope of the securities transmitted is similar to USA Today, which is estimated to be around 9,600 stocks and mutual funds. Assume further that the full security names are used, the format is unrestricted text with no compression and about 17 octets per security is used to display the company name, value and change in value. The size of the payload is then about 163,000 octets. If the technique of channelization as described in application Ser. No 09/113,317, to the present inventor, filed Jul. 10, 1998 and assigned to the assignee of the present application, the disclosure of which is hereby incorporated herein by reference in its entirety is used, the amount of data can be reduced approximately by a factor of 10. The residual amount of data may still be very large. Such a large amount of data may not be sent over an error prone radio channel without special consideration. The probability of correctly received payload may approach zero as the size of the payload increases.

In point-to-point communication, the overall payload is broken down into smaller segments in which there is a fairly large probability that each segment will be received correctly by the receiver. The receiver requests that the sender retransmit the segments which were not correctly received. This is often referred as an ARQ protocol and may be found in data communication protocols used in cellular systems when transmitting data more then in the order of a few hundred octets.

For broadcast services, retransmission request of erroneously received segments may not be desirable. The channel is a downlink channel only. However, the payload is repeated in an ever-ending loop. The receiver has multiple chances of receiving the same payload. Compared with a point-to-point ARQ protocol, it can be viewed as an unsolicited repeat of the entire payload. However, this may increase the delay in delivering the service. If the receiver only needs to wait for subsequent segments which were in error instead of discarding the entire message if any portion of the message was not correctly received, the performance, i.e. the expected delivery time, may be substantially improved.

The ANSI 136 broadcast protocol segments a message into several segments denoted Layer 2 frames. Each segment can be uniquely identified and the wireless terminal needs only to reread the not correctly received Layer 2 frames in the subsequent transmission (cycle). The wireless terminal can store all the correct received Layer 2 frames from the first read cycle and can reread the remaining segments in the following cycle until all Layer 2 frames belonging to a message are correctly received. However, for the very long payload as illustrated above, the number of cycles until a fully correct payload is received may be very large, which can render the service almost useless.

Another exemplary service is the data used for "Intelligent Roaming" (IR) as defined in ANSI 136. This information guides the wireless terminal to find the best service provider, i.e. the best roaming partner among the 2 operators on 800 MHz and up to 6operators on 1900 MHz. The amount of data that can be expected for the IR service is up to about 2,500 octets. As will be illustrated below, even for this smaller amount of data the performance of the existing broadcast channel may not be sufficient in order to provide a viable service. In this case the amount of time for the mobile to acquire the data may be considered of relatively less concern compared to an end-user service. However, the long dwelling time on the broadcast channel may unnecessarily cause the wireless terminal to be in active listening mode when it could much sooner enter into sleep mode in which the battery drain is reduced.

The invention can substantially reduce the number of cycles to be read by the wireless terminal with corresponding faster access to the content. The invention can also provide a new format of a broadcast channel which can be backwards compatible with existing formats. Thus, both new and old wireless terminals can share the same broadcast channel for information that is common to both wireless terminals. A varying degree of channel coding may be provided to tailor a particular service requirement. An indication of the progress of reading a broadcast service may be provided to the end-user. Information may be provided to a wireless terminal on how many times a message set is repeated and a sequence number may be incremented for each instance of transmitting the message set.

IS-136 TDMA System

The following description is provided in terms of a cellular telephone system, but it will be understood that the invention is not limited to that environment and may be used with any wireless terminal. Also, the following description is provided in the context of IS-136 compliant, TDMA cellular communication systems, but it will be understood by those skilled in the art that the present invention may be implemented in other digital communication applications including those which are designed in accordance with other standards, such as GSM or PDC, and those which use CDMA as an access methodology, such as SI-95.

In a conventional cellular radio system as shown in FIG. 1, a geographical area (e.g., a metropolitan area) is divided into several smaller, contiguous radio coverage areas (called "cells") such as cells C1–C10. The cells C1–C10 are served by a corresponding group of fixed radio stations (called "base stations") B1–B10, each of which operates on a subset of the radio frequency (RF) channels assigned to the system. The RF channels allocated to any given cell may be reallocated to a distant cell in accordance with a frequency reuse pattern as is well known in the art. In each cell, at least one RF channel (called the "control" or "paging/access" channel) is used to carry control or supervisory messages, and the other RF channels (called the "voice" or "speech" channels) are used to carry voice conversations. The cellular telephone users (mobile subscribers) in the cells C1–C10 are provided with portable (hand-held), transportable (hand-carried) or mobile (car-mounted) telephone units (wireless terminals) such as wireless terminals M1–M9, each of which communicates with a nearby base station. The base stations B1–B10 are connected to and controlled by a Mobile services Switching Center (MSC) 20. The MSC 20, in turn, is connected to a central office (not shown in FIG. 1) in the landline (wireline) Public Switched Telephone Network (PSTN) or to a similar facility such as an Integrated System Digital Network (ISDN). The MSC 20 switches calls between and among wireline and mobile subscribers, controls signaling to the wireless terminals, compiles billing statistics, and provides for the operation, maintenance and testing of the system.

When turned on (powered up), each of the wireless terminals M1–M9 enters the idle state (standby mode) and tunes to and continuously monitors the strongest control channel (generally, the control channel of the cell in which the wireless terminal is located at that moment).

To detect incoming calls, the wireless terminal continuously monitors the control channel to determine whether a page message addressed to it (i.e., containing its MIN) has been received. A page message will be sent to the wireless terminal, for example, when an ordinary (landline) subscriber calls the mobile subscriber. The call is directed from the PSTN to the MSC 20 where the dialed number is analyzed. If the dialed number is validated, the MSC 20 requests some or all of the base stations B1–B10 to page the called wireless terminal throughout their corresponding cells C1–C10. Each of the base stations B1–B10 which receive the request from the MSC 20 will then transmit over the control channel of the corresponding cell a page message containing the MIN of the called wireless terminal. Each of the idle wireless terminals M1–M9 which is present in that cell will compare the MIN in the page message received over the control channel with the MTN stored in the wireless terminal. The called wireless terminal with the matching MIN will automatically transmit a page response over the control channel to the base station which then forwards the page response to the MSC 20. Upon receiving the page response, the MSC 20 selects an available voice channel in the cell from which the page response was received (the MSC 20 maintains an idle channel list for this purpose), and requests the base station in that cell to order the wireless terminal via the control channel to tune to the selected voice channel. A through-connection is established once the wireless terminal has tuned to the selected voice channel.

FIG. 3 shows an exemplary DCCH superframe which includes at least three logical channels, namely, a Broadcast Control CHannel (BCCH), a Paging CHannel (PCH), and an Access Response CHannel (ARCH). The BCCH, which in this example is allocated 6 DCCH slots, carries overhead messages. The PCH, which is allocated one DCCH slot, carries paging messages. The ARCH, which is also allocated one DCCH slot, carries voice or speech channel assignment messages. The exemplary superframe of FIG. 6 may contain other logical channels, including additional paging channels (if more than one PCH is defined, different groups of wireless terminals may be assigned to different PCHs). A wireless terminal operating on the DCCH of FIG. 3 need only be "awake" (monitoring) during certain time slots (e.g., the BCCH and its assigned PCH) in each superframe and can enter "sleep mode" at all other times. While in sleep mode, the wireless terminal can turn off most internal circuitry and can save battery power. Furthermore, by configuring the BCCH as taught in U.S. Pat. No. 5,404,355 to the present inventor, entitled "Method For Transmitting Broadcast Information In A Digital Control Channel", the disclosure of which is hereby incorporated herein by reference, in its entirety the wireless terminal can read (i.e., decode) the overhead messages when locking onto the DCCH (e.g., at power-up) and thereafter only when the information has changed, thus allowing additional battery power savings while allowing for fast cell selection.

Figure 4A:
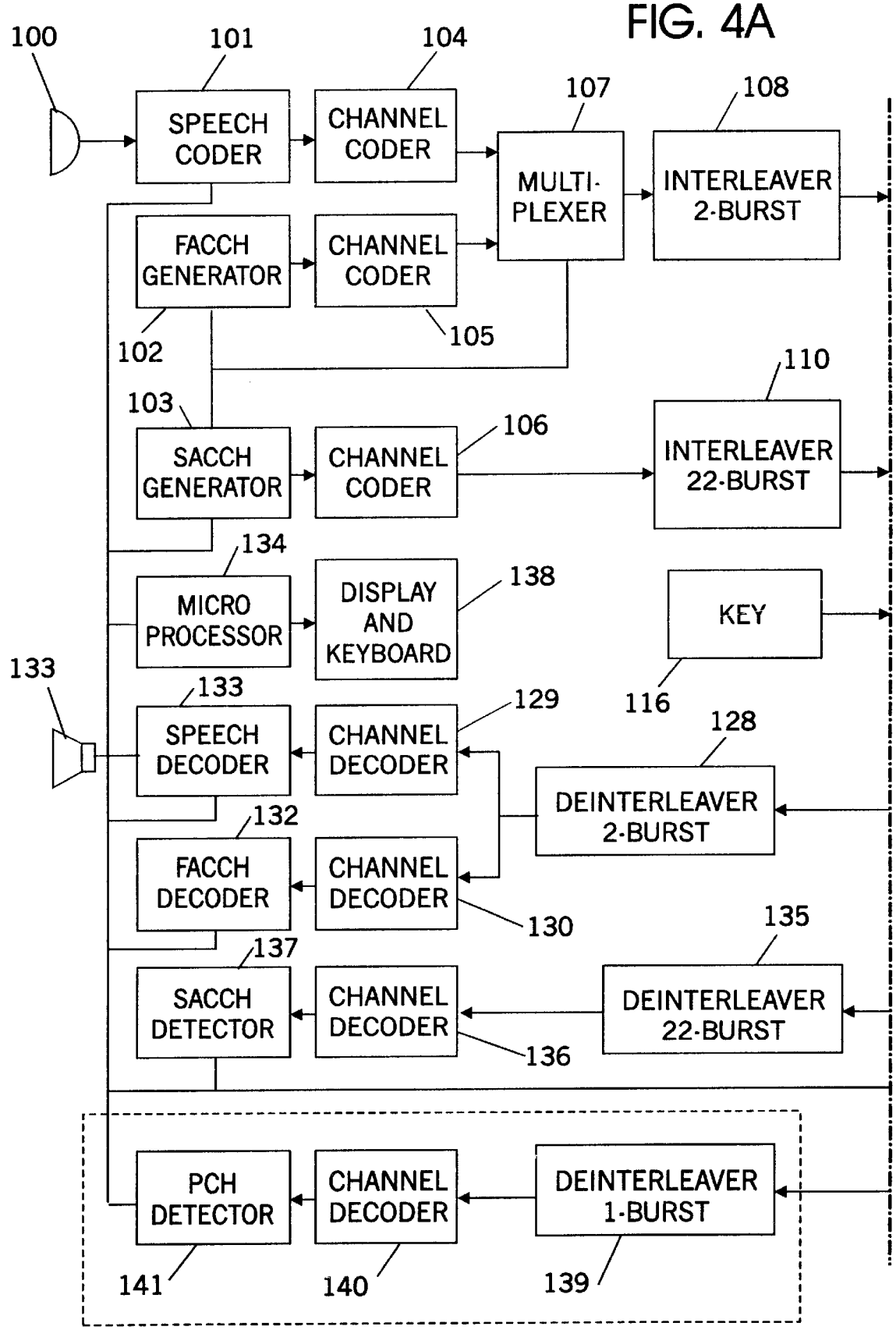
FIG. 4 is a block diagram of an exemplary mobile wireless terminal may be used in accordance with the present invention.

Referring now to FIG. 4, there is shown a block diagram of an exemplary wireless terminal which is generally compliant with IS-136 and which may be used in accordance with the present invention. In FIG. 4, certain components which are relevant to communications over digital channels are shown, but it will be appreciated that other digital or analog components may be used in addition to or in place of some of these components. The exemplary wireless terminals of FIG. 4 can transmit and receive speech and control data. The transmit circuitry is generally depicted in the upper half of FIG. 4 while the receive circuitry is generally depicted in the lower half of FIG. 4.

In the wireless terminal of FIG. 4, speech from the user is detected as an analog voice signal by a microphone 100 and then passed through one or more voice processing stages (not shown in FIG. 4) before being provided as input to a speech coder 101. The pre-coding voice processing stages may include audio level adjustment, bandpass filtering and analog-to-digital conversion (e.g., 13-bit PCM format or 8-bit &law format) followed by additional high-pass filtering. The speech coder 101 uses a voice compression algorithm (e.g., ACELP or VSELP) to compress the voice signal into a low-rate data bit stream (e.g., from 64 kbps to 8 kbps). The output of the speech coder 101 is fed to a channel coder 104 which applies one or more error protection and/or correction techniques to the data stream. For example, the channel coder 104 may use a rate one-half convolutional code to protect the more vulnerable bits of the speech coder data stream. The channel coder 104 may also use a Cyclic Redundancy Check (CRC) over some of the most perceptually significant bits of the speech coder frame.

Referring again to FIG. 4, control data is generated in the wireless terminal in a Fast Associated Control CHannel (FACCH) generator 102 and a Slow Associated Control CHannel (SACCH) generator 103, and error-coded in channel coders 105 and 106, respectively. FACCH messages are transmitted in a blank and burst mode whereby a burst of speech data is blanked and replaced with a high-rate FACCH burst. By contrast, SACCH messages are continuously transmitted at a slower rate along with each burst of speech data. In the exemplary embodiment shown in FIG. 4, SACCH messages are fed to a 22-burst interleaver 110 which spreads the SACCH data over 22 time slots prior to transmission.

With continuing reference to FIG. 4, the coded speech bits from the channel coder 104 and the coded FACCH messages from the channel coder 105 are provided to respective inputs of a time division multiplexer 107 which formats the speech data or FACCH messages into transmit time slots. The output of the multiplexer 107 is fed to a 2-burst interleaver 108 which interleaves the encoded speech or FACCH data over two time slots (e.g., slots 1 and 4 in FIG. 2) so as to ameliorate the deteriorative effects of Rayleigh fading (thus providing further protection against channel errors, in addition to error coding). This means that each speech time slot contains data from two consecutive speech coder frames or, similarly, that each FACCH message is spread over two time slots. The output of the 2-burst interleaver 108 is provided as input to a modulo-2 adder 109 where the data is ciphered on a bit-by-bit basis by logical modulo-2 addition with a pseudo-random keystream provided by a ciphering unit 115. The inputs to the ciphering unit 115 may include the value of a frame counter 114 which is incremented once every 20 ms (i.e., once every TDM frame for a full-rate channel), and a secret key 116 which is unique to the wireless terminal. The frame counter 114 is used to update the ciphering code (pseudo-random keystream) once every 20 ms (i.e., once for every transmitted TDM frame). The ciphering code is generated using an encryption algorithm which manipulates the bits of the secret key 116.

The ciphered data from the modulo-2 adder 109 and the interleaved SACCH data from the 22-burst interleaver 110 are provided as inputs to a burst generator 111 which is also provided with a synchronization (sync) word and a Digital Verification Color Code (DVCC) from a sync word/DVCC generator 112. The burst generator 111 formats bursts of data each comprising a sync word, DVCC, SACCH data and speech or FACCH data as shown in FIG. 5 (the "G" and "R" fields are for guard time and ramp time, respectively). The sync word is used for time slot identification and synchronization, and equalizer training at the remote receiver (i.e., base station). The DVCC is used to distinguish current traffic channels from traffic co-channels and ensures that the proper RF channel is being decoded by the receiver. The DVCC may be error-coded with, for example, a Hamming code. As will be seen below, the DVCC and sync word are also included in each of the bursts transmitted from the base station to the wireless terminal.

With further reference to FIG. 4, each of the message bursts from the burst generator 111 is transmitted in one of the three time slots of the TDM frame (full-rate) shown in FIG. 2 and discussed above. The burst generator 111 is connected to an equalizer 113 which provides the timing needed to synchronize the transmission of one time slot with the transmission of the other two time slots. The equalizer 113 detects timing signals sent from the base station (master) to the wireless terminal (slave) and synchronizes the burst generator 111 accordingly. The equalizer 113 may also be used for checking the values of the sync word and the DVCC received from the base station. Both the burst generator 111 and the equalizer 113 are connected to the frame counter 114 for timing purposes.

The message bursts produced by the burst generator 111 are provided as input to an RF modulator 117 which is used for modulating a carrier frequency in accordance with a modulation technique known as $\pi/4$ shifted, Differentially encoded Quadrature Phase Shift Keying ($\pi/4$ DQPSK). The use of this technique implies that the information to be transmitted by the wireless terminal is differentially encoded so that 2-bit symbols are transmitted as four possible changes in phase ($\pm\pi/4$ and $\pm 3\pi/4$) rather than absolute phases. To minimize errors due to noise in the selected RF channel, Gray coding may be used to map adjacent phase changes to symbols which differ in only one bit (since the most probable errors result in the receiver selecting an adjacent phase, such errors will be limited to single-bit errors). The carrier frequency for the selected RF channel is supplied to the RF modulator 117 by a transmitting frequency synthesizer 118. The burst-modulated carrier signal output of the RF modulator 117 is amplified by a power amplifier 119 and then transmitted to the base station through an antenna 120.

Reception at the wireless terminal may be the reverse of transmission. The wireless terminal receives burst modulated signals from the base station through an antenna 121 connected to a receiver 122. A receiver carrier frequency for the selected RF channel is generated by a receiving frequency synthesizer 123 and supplied to an RF demodulator 124 which demodulates the received carrier signal into an Intermediate Frequency (IF) signal. The IF signal is demodulated further by an IF demodulator 125 which recovers the original digital information prior to $\pi/4$-DQPSK modulation. The digital information is then passed to the equalizer 113 which formats the information into two-bit symbols, and then to a symbol detector 126 which converts the symbols into a single-bit data stream comprised of speech or FACCH data and SACCH data. The symbol detector 126 distributes the FACCH or speech data to a modulo-2 adder 127, and the SACCH data to a 22-burst deinterleaver 135. The modulo-2 adder 127 is connected to the ciphering unit 115 and is used to decipher the encrypted speech or FACCH data by subtracting, on a bit-by-bit basis, the same pseudo-random keystream used by the transmitter in the base station to encrypt the data. The deciphered output of the modulo-2 adder 127 is fed to a 2-burst deinterleaver 128 which reconstructs the speech or FACCH data by assembling bits from two consecutive frames of digital data. The 2-burst deinterleaver 128 is coupled to two channel decoders 129 and 130 which decode the convolutionally-coded speech or FACCH data, respectively, and check the CRC bits to determine if any error has occurred (the CRC bits also provide a method for distinguishing speech data from FACCH data). The speech data is fed from the channel decoder 129 to a speech decoder 131 which recovers the original digital speech signal. The signal is then converted to analog and filtered prior to broadcast by a speaker 133. Any FACCH messages are detected by a FACCH detector 132 and forwarded to a microprocessor 134 for appropriate action.

With continuing reference to FIG. 4, the 22-burst deinterleaver 135 reassembles the SACCH data which is spread over 22 consecutive frames. The output of the 22-burst deinterleaver 135 is provided as input to a channel decoder 136. Any SACCH messages are detected by a SACCH detector 137 and transferred to the microprocessor 134 for appropriate action.

The microprocessor 134 controls the activities of the wireless terminal and communications between the wireless terminal and the base station. Decisions are made by the microprocessor 134 in accordance with messages received from the base station and measurements performed by the wireless terminal. The microprocessor 134 is provided with a memory (not shown) and is also connected to a terminal keyboard input and display output unit 138. The keyboard and display unit 138 allows the user to initiate and respond to calls, and to enter information into the wireless terminal memory.

Figure 6B:
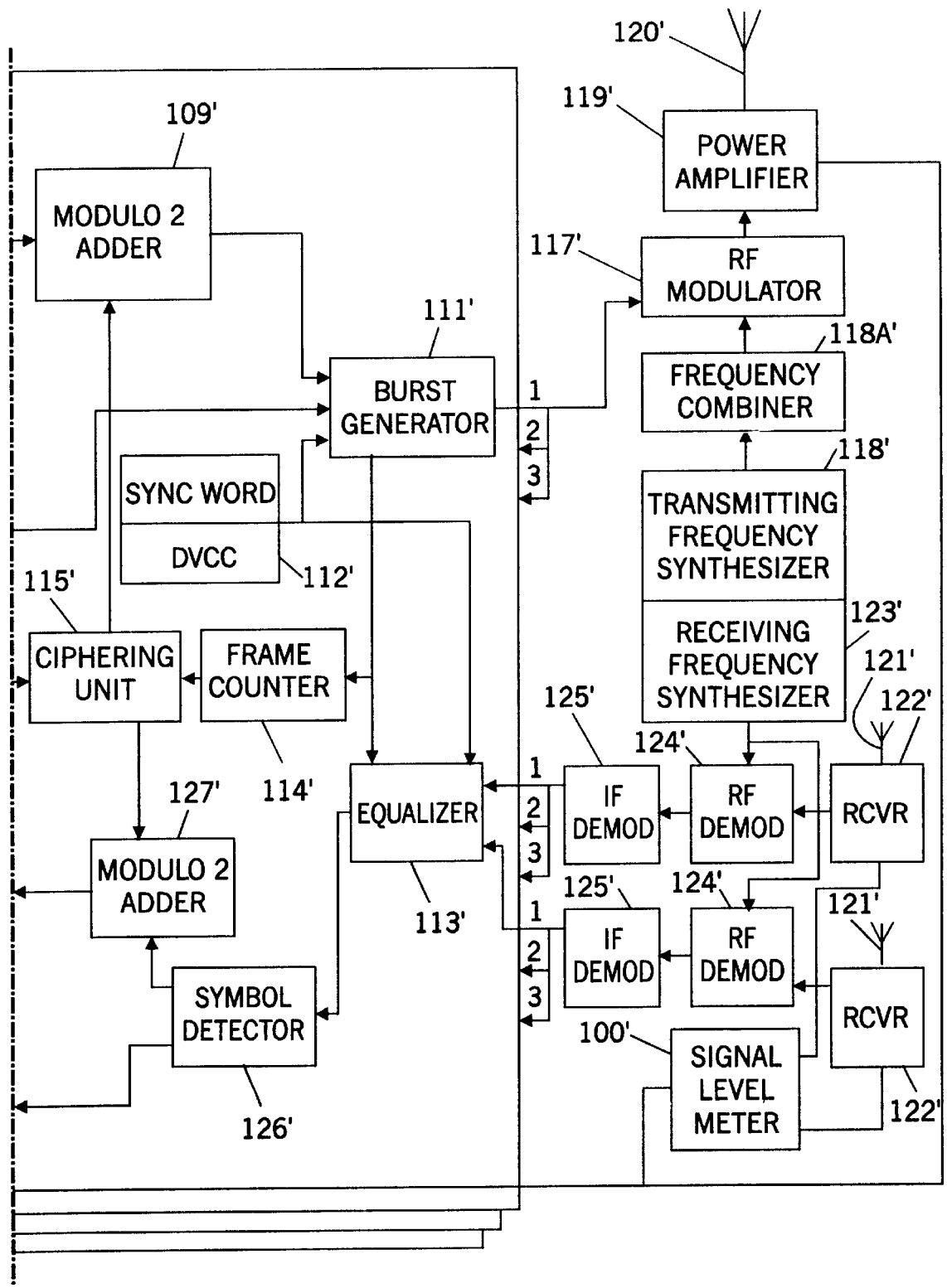
FIG. 6 is a block diagram of a base station which communicates with a wireless terminal of FIG. 4.

It should be noted that many of the components of the wireless terminal shown in FIG. 4 may be used to construct a base station as shown in FIG. 6 in which like components are designated with the same reference numerals as in FIG. 4 and further designated by a (') to distinguish the base station components from the wireless terminal components. The base station of FIG. 6 communicates with the wireless terminal of FIG. 4 using a slot format as shown in FIG. 7, which is similar to the slot format used by the wireless terminal, as shown in FIG. 5. As will be appreciated by persons of ordinary skill in the art, there may be certain differences in the construction of the base station and the wireless terminal. For example, as shown in FIG. 6, the base station may have not just one but two receiving antennas 121' and associated radio hardware 122'–125' for diversity reception. Furthermore, since the base station supports three (full-rate) digital traffic channels (DTCHs) per RF channel as shown in FIG. 2, the baseband processing hardware (border box in FIG. 6) may be triplicated in the base station, and the IF demodulator 125' may have not just one but three outputs, one for each of the three digital traffic channels. In addition, since the base station usually operates on multiple RF channels, it may include multiple sets of radio channel hardware (baseband processing and radio hardware) as well as a programmable frequency combiner 118A' to carry out the selection of the RF channels to be used by the base station according to the applicable cellular frequency reuse plan. On the other hand, the base station may not include a user keyboard and display unit 138, but may include a signal level meter 100' to measure the strength of the signal received by each the two antennas 121' and to provide an output to the microprocessor 134' (for handoff purposes). Other differences between the wireless terminal and the base station will be readily apparent to those skilled in the art.

The wireless terminal of FIG. 4 and the related base station of FIG. 6 are capable of operating on a digital traffic channel (DTCH), but may also be readily configured to operate on a digital control channel (DCCH) if, for example, the length and format of a DCCH slot are made compatible with those specified for the DTCH slot in IS-136 as suggested in the above-cited U.S. Pat. 5,404,355. FIG. 4 shows (in dashed box) additional wireless terminal components which, for example, can be used for decoding messages transmitted over a Paging CHannel (PCH) of the DCCH. Although PCH messages, like FACCH and SACCH messages, are interleaved to protect against errors induced by the radio channel, the interleaving of PCH messages is limited to within one slot (intra-slot interleaving) since, for purposes of sleep mode efficiency, the wireless terminal should not be awake for more than one PCH slot. As shown in FIG. 4, after demodulation and equalization, the paging messages are deinterleaved in a 1-burst deinterleaver 139 before channel decoding in a channel decoder 140 and detection in a PCH detector 141. Any page messages are forwarded from the PCH detector 141 to the microprocessor 134 for analysis and action.

For purposes of the present invention, as described further below, although a DCCH format which is compatible with the IS-136 DCCH format may be used, in general any DCCH format or, for that matter, interleaving method may be used such as, for example, the DCCH format and interleaving method specified in the GSM standard. Furthermore, the DCCH may be implemented using transmission techniques other than or in combination with Time Division Multiplexing (TDM) such as, for example, Code Division Multiplexing (CDM).

Figure 8:
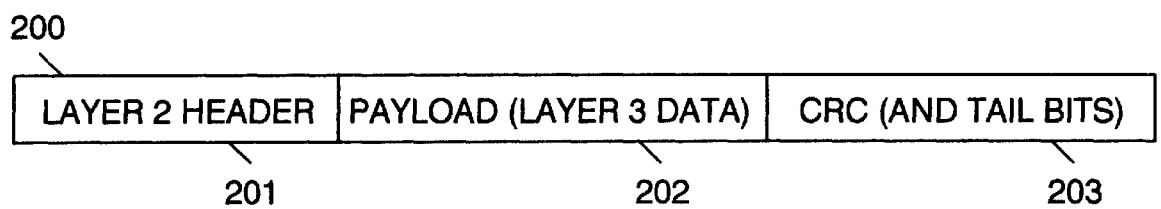
FIG. 8 shows the format for a Layer 2 (L2) frame which may be used to transmit a page message in accordance with industry or government standards.
Figure 9:
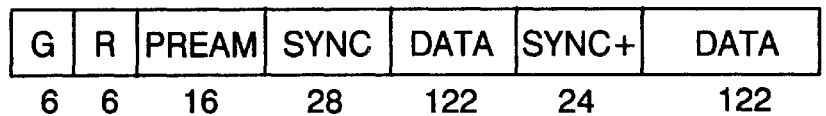
FIG. 9 shows an uplink slot format of the DCCH according to IS-136.

PCH operation according to industry or government standards (e.g., SI-95 and IS-136 in the U.S., GSM in Europe, and PDC in Japan) is illustrated in FIG. 8. Referring to FIG. 8, most of these standards provide for the construction of a page message (before error correction coding and interleaving) as a "Layer 2" (L2) frame of data 200 containing a Layer 2 header 201, a payload of "Layer 3" (L3) message data 202, and an error detection code such as a Cyclic Redundancy Check (CRC). code with tail bits 203 (tail bits are generally used with convolutional coding and are usually set to zero). The header 201 includes overhead information for radio resource management (e.g., actions to be taken by the receiver) or for other purposes, and may also include an indication of the type or length of the Layer 3 data in the payload 202 (e.g., a bit may be assigned in the header 201 to indicate an empty page message in the payload 202). For an empty page, the payload 202 includes a predetermined value which is defined by the applicable standard (e.g., all zeros in IS-136). For a non-empty page, the payload 202 includes a Mobile Station IDentifier (MSID) and, possibly, auxiliary data such as an indication of the type of call (i.e., speech, data, etc.). The header 201 and the payload 202 are encoded with the CRC code 203 for error detection purposes.

Prior to transmission over the PCH, the frame 200 is encoded with an error correction code, and the encoded data is interleaved over one or more slots in accordance with the specification of the applicable standard. At the receiver (e.g., wireless terminal), the received slot(s) are first demodulated and, possibly, equalized. This is followed by deinterleaving of the demodulated (and possibly equalized) data and channel decoding of the deinterleaved data. The wireless terminal also checks for residual errors by calculating the CRC using the deinterleaved and decoded data (i.e., the received header 201 and payload 202) and comparing the calculated CRC with the received CRC (i.e., the received CRC 203). If the CRC comparison indicates that the data was correctly received, the wireless terminal checks the received header 201 to determine whether any action is required, and whether the message is an empty page. If no action is required and the message is an empty page, the wireless terminal can go back to sleep. If a certain action is required, the wireless terminal takes the required action. In addition, if the page is not an empty page (i.e., it is a non-empty page), the wireless terminal compares the received MSID with its own MSID which is stored in memory. If the MSIDs match, the wireless terminal sends a page response to the system. However, if the MSIDs do not match (i.e., the page is for another wireless terminal), the wireless terminal can return to sleep.

Figure 10:
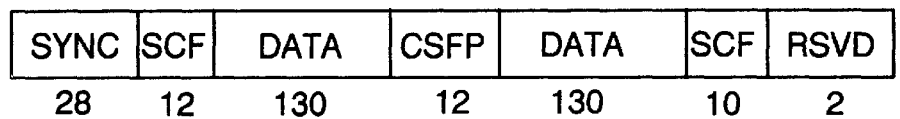
FIG. 10 shows a downlink slot format of the DCCH according to IS-136.

As shown in FIG. 10, the DCCH downlink slot includes a Shared Channel Feedback (SCF) field which contains information to support the random access scheme on the uplink. The DCCH downlink slot further includes a Coded SuperFrame Phase (CSFP) field which contains information to aid the wireless terminal in finding the start of the superframe on the DCCH. Another notable difference between the DCCH and DTCH slot formats is the absence of interslot interleaving on the DCCH so as to facilitate sleep mode operation.

Referring next to FIG. 11 which shows the frame structure of the (downlink) DCCH according to IS-136, the DCCH slots are mapped into logical channels which are organized into a series of superframes (there is no special frame structure for the uplink DCCH as all time slots on the uplink may be used for system access by the wireless terminal). A full-rate DCCH would occupy two of the six slots of an IS-136 TDMA frame, as shown in FIG. 11 (in this example, channel "A" is assigned to the DCCH). The logical channels specified in IS-136 include a Broadcast Control CHannel (BCCH) for carrying system-related information which is broadcast to all wireless terminals, and a Short message service, Paging and Access response CHannel (SPACH) for carrying information which is sent to specific wireless terminals. The structure and operation of the BCCH and SPACH are described in more detail below.

For efficient sleep mode operation with fast acquisition at cell (i.e., DCCH) selection, the BCCH is divided into logical subchannels as taught in the above-cited U.S. Pat. No. 5,404,355. As shown in FIG. 11, the BCCH comprises a Fast BCCH (F-BCCH), an Extended BCCH (E-BCCH) and a point-to-multipoint Short message service BCCH (S-BCCH). The F-BCCH is used to broadcast DCCH structure parameters and other parameters required for accessing the system. The E-BCCH is used to broadcast information that is not as time-critical (for the operation of the wireless terminals) as the information in the F-BCCH. The S-BCCH is used for the broadcast short message service (SMS). The SPACH is also divided into logical subchannels (not shown in FIG. 11) including a point-to-point Short Message Service CHannel (SMSCH), a Paging CHannel (PCH) and an Access Response CHannel (ARCH). The SMSCH is used for carrying user messages to a specific wireless terminal. The PCH is used for carrying paging messages to different wireless terminals. The ARCH is used for responding to access requests from one of the wireless terminals (e.g., by delivering a channel assignment message to this wireless terminal).

The F-BCCH and E-BCCH allow the system to transmit different kinds of overhead information at different rates depending on its importance to the proper operation of the wireless terminals. Information defining the system configuration and the rules for system access by the wireless terminals is transmitted in the F-BCCH. Since this information should be transmitted at a rate which allows the wireless terminals to quickly access the system, a complete set of this information is sent in the F-BCCH once every superframe. Less critical overhead information, however, may be transmitted at a lower rate in the E-BCCH. A complete set of E-BCCH information may span several superframes. The S-BCCH, on the other hand, allows the system to decouple the transmission of overhead information from the broadcast SMS by providing a dedicated channel for SMS messages.

To decouple the requirement of periodicity of reading of the overhead information by the wireless terminal (for purposes of efficient sleep mode operation) from the requirement of periodicity of BCCH transmission by the system (for purposes of fast acquisition at cell selection), each of the F-BCCH and E-BCCH subchannels is associated with a change flag in another logical subchannel, which indicates when the corresponding BCCH information has changed (e.g., changes in the F-BCCH are indicated by a change flag in the PCH and changes in the E-BCCH are indicated by a change flag in the F-BCCH). The change flags enable a wireless terminal to avoid rereading BCCH information which has not changed thereby reducing battery drain, as taught in the above-cited U.S. Pat. No. 5,404,355. The wireless terminal will first read the required BCCH information when acquiring the DCCH. Thereafter, however, the wireless terminal will read only changed BCCH information and can stay in sleep mode when there is no change in the BCCH information. This allows for efficient sleep mode operation (i.e., low periodicity of reading BCCH information) and, at the same time, fast acquisition at cell selection (i.e., higher periodicity of BCCH transmission).

With continuing reference to FIG. 11, a superframe is defined in IS-136 as the collection of 32 consecutive time slots (640 ms) for a full-rate DCCH (16 slots for a half-rate DCCH) starting with the first BCCH slot. The first slot(s) in the superframe are assigned to the F-BCCH and the remaining slots are assigned to the E-BCCH, S-BCCH and SPACH. A wireless terminal determines from information in the F-BCCH slot(s) at the beginning of the superframe which of the other slots are assigned to E-BCCH, S-BCCH and SPACH, respectively. As shown in FIG. 11, each of the BCCH subchannels (F-BCCH, E-BCCH and S-BCCH) is assigned an integer number of the DCCH time slots in each repeating superframe. The other slots in the superframe, however, are assigned to the SPACH subchannels (SMSCH, PCH and ARCH) on a fully dynamic basis (for this reason, the slots available in each superframe for SMSCH, PCH and ARCH are generically shown as SPACH in FIG. 11). A wireless terminal identifies the usage of a SPACH slot (i.e., SMSCH, PCH or ARCH) from Layer 2 header information.

IS-136 specifies three forms of Mobile Station IDentity (MSID) which may be used for paging a wireless terminal: the Mobile Identification Number (MIN), the International Mobile Station Identity (IMSI), and the Temporary Mobile Station Identity (TMSI). The MIN traces its roots to the EIA/TIA 553 and IS-54 standards (discussed earlier) and is a digital representation of the directory number of the wireless terminal according to the telephone numbering plan in North America. The IMSI is used for international roaming and it includes a country code which identifies the country of origin of the wireless terminal, and other information for identifying its home system (for billing and other purposes). The TMSI is assigned to a wireless terminal on a temporary basis within a specific area (e.g., the service area of an MSC or a location area in this service area) and the wireless terminal is usually reassigned to another TMSI after a predetermined period of time or when the wireless terminal moves out of this area. The primary benefit of using the TMSI is increased paging capacity since the TMSI usually contains less bits than the MIN or IMSI and, hence, more pages can be carried in one PCH slot (depending on the assignment procedures for the TMSI, another benefit may be increased user identity confidentiality).

A wireless terminal according to IS-136 may be assigned a MIN, an IMSI, or both a MIN and an IMSI. The MIN and/or IMSI are referred to as the Permanent Mobile Station IDentity (PMSID) in IS-136. A wireless terminal having both a MIN and an IMSI will only use one or the other as its PMSID, determined by BCCH data, as specified in the IS-136 standard. However, the wireless terminal may use both a PMSID (i.e., either MIN or IMSI) and a TMSI, but at different times. At any given time, the wireless terminal uses one or the other of PMSID and TMSI. The wireless terminal will usually monitor its PCH slot for its PMSID. If a TMSI is assigned to the wireless terminal, the wireless terminal will then monitor the PCH slot only for the TMSI. The TMSI assignment, however, may expire and if no new TMSI is assigned, the wireless terminal reverts back to using the PMSID when communicating with the system. In IS-136, an identity type (IDT) field may be included in the Layer 2 frame to inform the wireless terminal which identity is being used in the page message. The IDT field, however, may not be included in the Layer 2 frame if the type of identity is implicit from the type of frame. Other standards may require a wireless terminal to monitor PCH for both PMSID and TMSI.

According to IS-136, all pages (whether containing PMSID or TMSI) are repeated in the corresponding time slot in the next superframe so as to increase the likelihood that a wireless terminal will receive a page even under severe radio conditions. If and only if the wireless terminal cannot decode the PCH slot in the first ("primary") superframe, it will read the corresponding PCH slot in the second ("secondary") superframe (the primary and secondary superframes are collectively referred as a "hyperframe").

IS-136, like other standards, uses a layered approach to the transmission of messages over the DCCH. FIG. 12 shows how a "Layer 3" (L3) message (e.g., a page message) is translated into one or more "Layer 2" (L2) frames which are then mapped into a "Layer 1" (L1) physical layer slot. The L3 message is parsed into as many L2 frames as needed under the applicable protocol (different protocols are specified for BCCH and SPACH). Each L2 frame comprises L3 data and overhead information for L2 protocol operation. Each L2 frame is mapped into a single L1 slot through the addition of error coding (CRC and tail bits) and overhead information (header) specific to physical layer operation. For all IS-136 DCCH subchannels, L2 operation has been defined to be aligned with L1 operation such that a complete L2 protocol frame is carried within a single underlying physical layer slot. Thus, all bits of any L2 frame are sent within one physical slot (i.e., only intra-slot interleaving is performed after channel coding and before transmission).

Overview of the Invention

Figure 13:
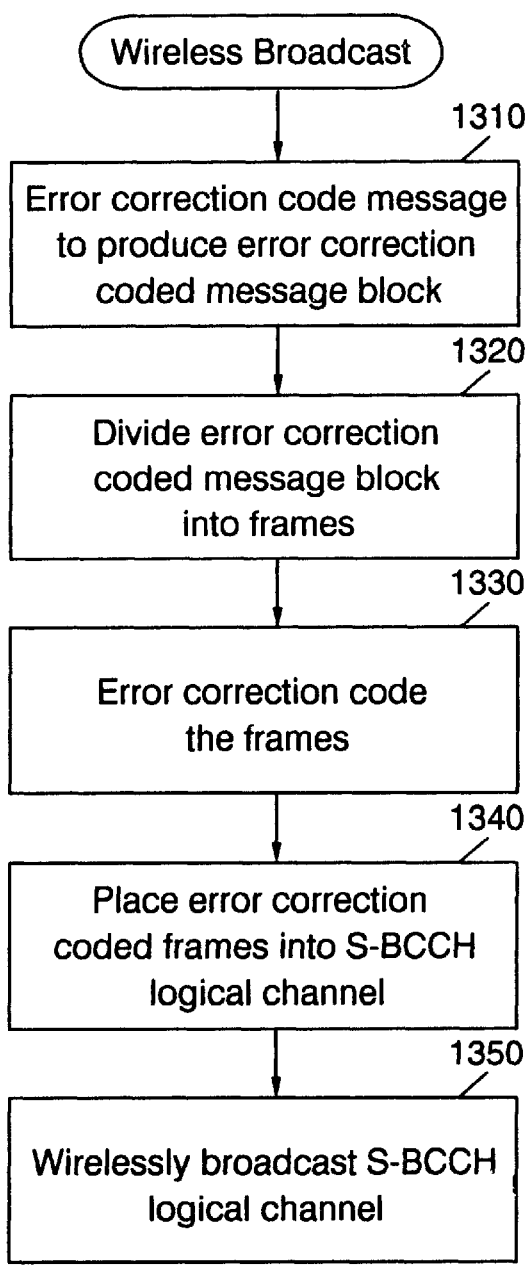
FIG. 13 illustrates operations for wirelessly broadcasting a message to a plurality of wireless terminals, such as TDMA wireless terminals, according to the present invention.
Figure 14:
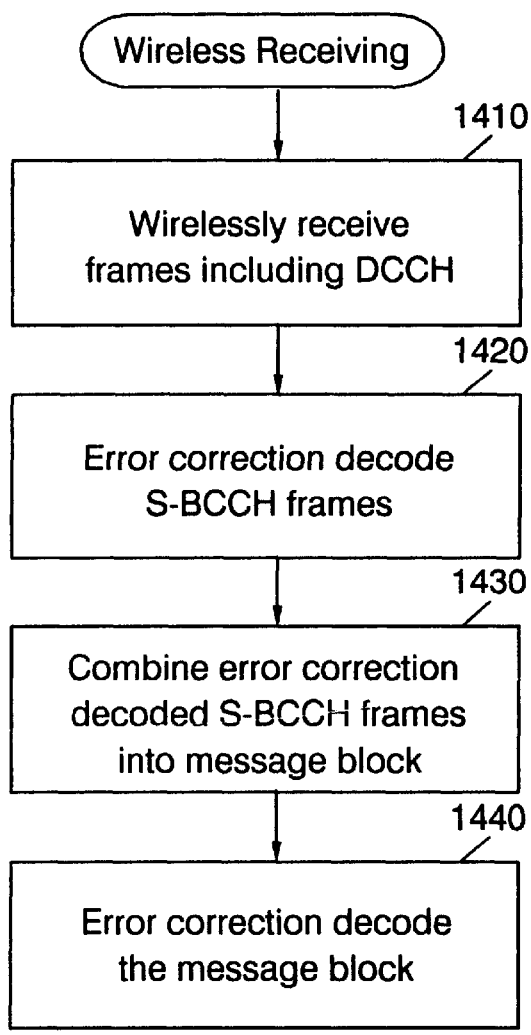
FIG. 14 illustrates operations for wirelessly receiving a broadcast message at a wireless terminal, such as TDMA wireless terminals, according to the present invention.

FIG. 13 illustrates operations for wirelessly broadcasting a message to a plurality of wireless terminals, such as TDMA wireless terminals, according to the present invention. FIG. 14 illustrates operations for wirelessly receiving a broadcast message at a wireless terminal, such as TDMA wireless terminals, according to the present invention.

As will be appreciated by one of skill in the art, the present invention may be embodied as methods, systems (apparatus) and/or computer program products. Accordingly, the present invention may take the form of an entirely hardware or an embodiment combining software and hardware aspects.

Various aspects of the present invention are illustrated in detail in the following FIGS. 13 and 14, including flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Referring now to FIG. 13, messages are wirelessly broadcast to a plurality of wireless terminals in a wireless system that includes a DCCH having an S-BCCH logical channel. As shown in Block 1310, the message is error correction coded to produce an error correction coded message block. As shown in Block 1320, the error correction coded message block is divided into frames. At Block 1330, the frames are error correction coded to produce a plurality of error correction coded frames.

At Block 1340, the error correction coded frames are wireless broadcast to the wireless terminals by placing the error correction coded into the S-BCCH logical channel. Finally, at Block 1350, the S-BCCH logical channel is wirelessly broadcast.

Accordingly, as shown in FIG. 13, the entire message is error correction coded prior to dividing the message into frames and error correction coding the individual frames. By error correction coding the message in addition to error correction coding the frames, more robust broadcast of long messages may be provided.

Referring now to FIG. 14, a broadcast message is wirelessly received at a wireless terminal in a wireless system. At Block 1410, the frames including the DCCH are wirelessly received. At Block 1420, at least a portion of the S-BCCH in the DCCH is error correction decoded to produce a plurality of error correction decoded frames. At Block 1430, the error correction decoded S-BCCH frames are combined into a message block. Finally, at Block 1440, the message block is error correction decoded. Thus, each of the frames is error correction decoded and the entire message block is error correction decoded. Even if one or more of the frames is improperly received, the overall error correction decoding of the message block can recover the frame(s) that were not properly received, and thereby allow the complete message to be received.

Detailed Description of Wireless Broadcast and Reception

FIG. 15 illustrates the frame structure of a forward (base station to wireless terminal) DCCH according to IS-136 and shows two successive HyperFrames (HF), each of which preferably comprises a respective primary SuperFrame (SF) and a respective secondary superframe. It will be recognized, of course, that a hyperframe a may include more than two superframes.

Three successive superframes are illustrated in FIG. 15, each comprising a plurality of time slots that are organized as logical channels F-BCCH, E-BCCH, S-BCCH, and SPACH that are described in more detail below. At this point, it is sufficient to note that each superframe in a forward DCCH includes a complete set of F-BCCH information (i.e., a set of Layer 3 messages), using as many slots as are necessary, and that each superframe begins with a F-BCCH slot. After the F-BCCH slot or slots, the remaining slots in each superframe include one or more (or no) slots for the E-BCCH, S-BCCH, and SPACH logical channels.

Referring to FIG. 15, and more particularly to FIG. 16, each superframe of the downlink (forward) DCCH preferably comprises a broadcast control channel BCCH, and a Short-message-servicefPaging/Access CHannel (SPACH). The BCCH comprises a fast BCCH (the F-BCCH shown in FIG. 15); an extended BCCH (the E-BCCH); and a short-message-service BCCH (the S-BCCH), some of which are used, in general, to carry generic, system-related information from the base stations to the wireless terminals.

The F-BCCH logical channel carries time-critical system information, such as the structure of the DCCH, other parameters that are used for accessing the system, and an E-BCCH change flag which is described in more detail in the above-cited U.S. Pat. No. 5,404,355. As noted above, a complete set of F-BCCH information is sent in every superframe. The E-BCCH logical channel carries system information that is less time-critical than the information sent on the F-BCCH. A complete set of E-BCCH information (i.e., a set of Layer 3 messages) may span several superframes and need not be aligned to start in the first E-BCCH slot of a superframe. The S-BCCH logical channel carries short broadcast messages, such as stock information, advertisements and other information of interest to various classes of mobile subscribers. According to exemplary embodiments of the present invention, this logical channel may be used to support information services, for example a security quote service or a sports information service.

Figure 17B:
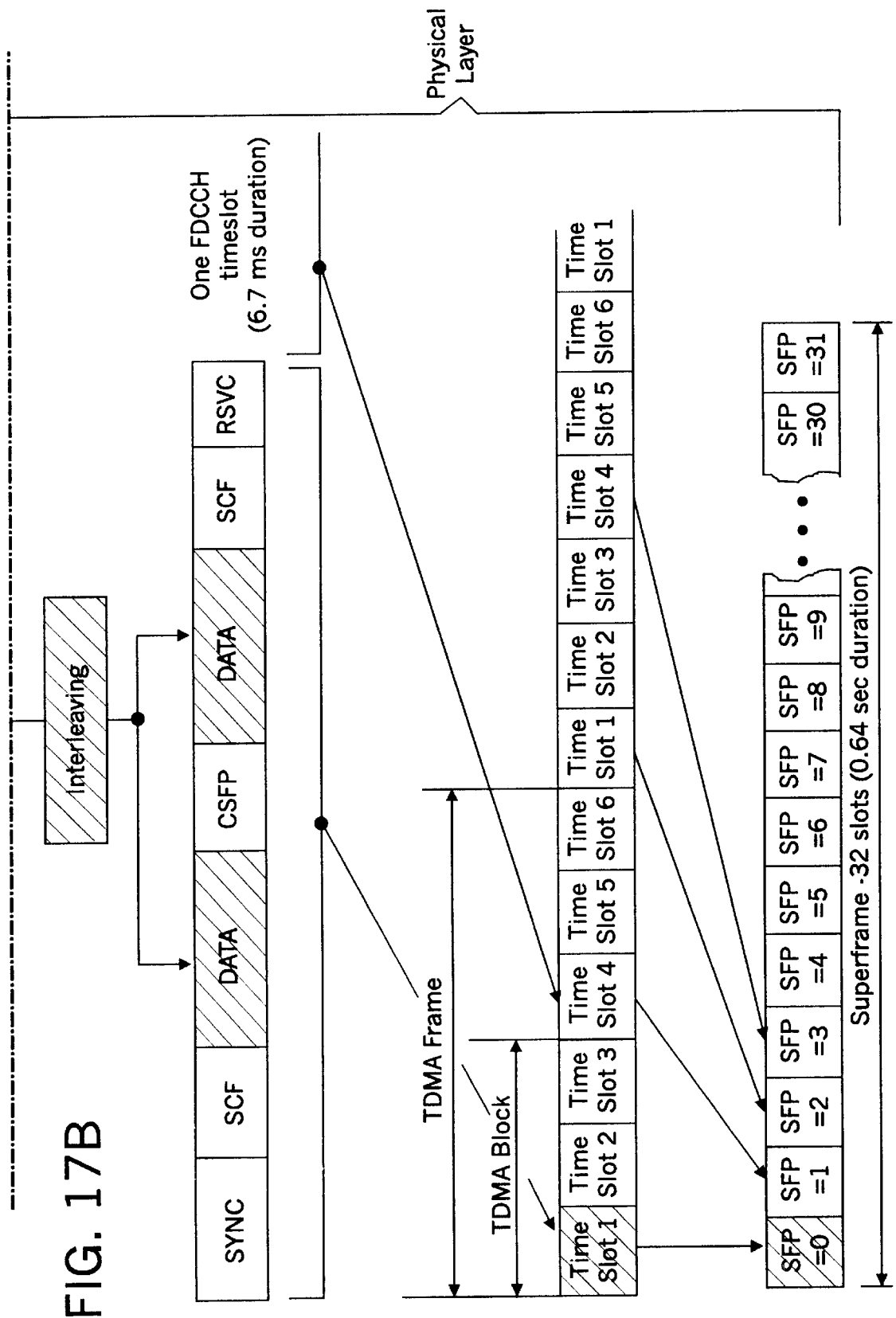
FIG. 17 illustrates mapping of a Layer 3 message to Layer 2 and further to the Physical Layer on the downlink of the Digital Control CHannel (DCCH) of the ANSI 136 standard, including channel coding between Layer 3 and Layer 2 according to the invention.

FIG. 17 shows how messages on the downlink DCCH are mapped into timeslots. A Layer 3 message including of up to 255 octets is broken up into smaller segments. These segments together with overhead a error detection code and "tail-bits" form a Layer 2 frame. The particular Layer 2 overhead for a S-BCCH is shown in FIGS. 18–20 and will be described later. Each Layer 2 frame is protected by a rate ½ error correcting convolutional code and the resulting data is interleaved and mapped into a single time slot. The number of Layer 2 frames needed to carry a Layer 3 messages is dependent on the length of the Layer 3 message.

FIG. 17 shows the inclusion of channel coding according to the present invention between Layer 3 and Layer 2. The coding in Layer 2 allows the mobile to correctly receive a Layer 2 frame with about 90% probability for Carrier-to-Interference ratio (C/I) of 12–14 dB depending on e.g. vehicular speed. The design criteria and frequency reuse planning for an ANSI 136 system typically results in that less than 10% of the users experience a C/I below these numbers. Thus, less than 10% of the users will experience a Layer 2 frame error rate of 10%.

Messages on the broadcast channel (S-BCCH) are not subject to ARQ as for point-to-point messages. An application layer message may include multiple Layer 3 messages. The Message Error Rate (MER) for very long application layer messages goes to one, as the message length becomes very long. Only a single Layer 2 frame in any of the multiple Layer 3 messages carrying the application message need to be in error in order to obtain an application message error, as shown in FIG. 17.

By providing channel coding in the application layer or in Layer 3 according to the invention, the performance can be improved substantially. Only a small amount of redundancy may be needed to improve the performance. Thus, the penalty in throughput for wireless terminals that have an almost perfect radio link quality and are not exposed to any errors, can be reduced and preferably minimized.

To improve the performance of very long application layer messages the coding can be performed in the application layer or in Layer 3. In order to assess the performance improvement, coding in Layer 3 is assumed. Before a Layer 3 message is sent to Layer 2 the entire Layer 3 message is protected by a block code. The header of the message is part of the encoding. See FIG. 17, where a block "Channel coding" has been added between Layer 3 and Layer 2. From a Layer 2 perspective, the now increased Layer 3 message is viewed as the Layer 3 message, i.e. the length of Layer 3 payload and the Layer 3 redundancy part constitutes a Layer 3 message from Layer 2 perspective.

For very short application messages there may be no or a negative merit in providing higher layer channel coding. Thus, channel coding, beyond Layer 2 coding, should only be enabled for longer messages.

Indication of Coding to Wireless Terminal p The receiving end of Layer 3 may need to know whether the Layer 3 message is subject to channel coding or not. There are at least three ways to inform the wireless terminal what type of coding is applied:

1. The indication can be out-of-band, i.e. the indication is provided outside the envelope of the data subject to channel coding. The indication can be provided in the BCCH. For IS-136, which uses a Broadcast Air-interface Transport Service (BATS) Layer, the indication whether a category (e.g. stock quotes) is subject to channel coding can be provided in the BATS.

2. The indication can be in-band, i.e. the indication is provided inside the envelope of data subject to channel coding. For systematic codes the redundancy is added to the data subject for coding, i.e. the data subject for coding is not changed by the coding process. In non-systematic coding, the source data may be altered by the coding process. The indication can be provided together with the overhead part of the segment subject for coding. For example, if systematic coding is performed on a Layer 3 message, the overhead part of the Layer 3 message can include an information element indicating the type of channel coding. Thus in FIG. 17, the indication can be provided inside the Layer 3 message, just after the PD and MT.

3. The indication can be implicit in the category, service type or message type. For example, if the channel coding is applied on the Layer 3 messages, the Message Type (MT) can implicitly indicate channel coding. Thus, for certain values of MT channel coding is applied. However, the type of channel coding (e.g. amount of redundancy) preferably is not varied for a particular MT. Systematic encoding allows the receiver to first examine the MT before determining whether redundancy is provided or not. This example is similar to the option 2 described above. Another example is to associate a service type or category with a predetermined coding format and send out of band.

Explicit indication of type of channel coding can allow for varying degrees or various types of channel coding. For implicit indication, the type of channel coding generally is fixed within the scope of the indication (e.g. message, service, category etc). However, different messages, categories etc may have different form of coding.

It will also be understood that the wireless terminal can deduce the presence or absence of coding by running two or more decoders in parallel. However, this may produce increased complexity. Moreover, the use of two decoders may not indicate the type of message that is being encoded, e.g. stock quotes or sports scores. Accordingly, an indication as described above may be preferred.

Reed-Solomon (RS Codes)

An RS code is a block code in which K symbols of source data are encoded into N symbols. The code is described as an (N,K) code. The number of errors correctable are Int[(N−K+1)/2] where Int is the integer function. The coding and decoding is performed using mathematical operations in a Galios Field (GF(q)), where q is the number of mathematical symbols in the Galios Field. The default length of the code, the number of code symbols used to define a codeword is N=q−1. Thus, a RS codeword includes of q−1 symbols, where each symbol may take on any of q values. The number of actual used symbols may be smaller than N by deleting (omitting) some of the information symbols without affecting its error correcting capabilities. For example, the default length using a 256 GF alphabet (GF(256)) is 255. Eight bits may be used to represent each symbol in GF(256).

Erasure Decoding of Reed-Solomon Codes If up to N−K symbols are known to be unreliable and the remaining K symbols are correct, the decoder can reconstruct the N−K unreliable symbols. This form of decoding is known as erasure-decoding. The receiver has identified certain symbols to be unreliable and can provide this indication to the decoder prior to decoding.

The receiver provides side information to the decoder indicating that the received symbol is unreliable. The maximum number of symbols that can be corrected by this process is twice the number of symbols that can be corrected without side information. However, if a symbol is incorrect but not indicated as non-reliable, the number of erased symbols that is possible to correct, is two less than the maximum. Thus, to obtain the full potential of the correction capability of erasure decoding, the side information should be reliable.

In the proposed architecture the side information can be very reliable, as a result of the 16-bit CRC check performed on every received L2 frame. All or none of the symbols contained in one L2 frame are erased. Thus, this architecture can exploit the full potential of RS erasure decoding.

In the proposed architecture the performance of RS erasure decoding may be explained as follows: In order to be able to correct one L2 frame in a L3 message one L2 frame of redundancy symbols is provided.

The performance of an RS encoder placed above Layer 2 can be very powerful. This is due at least to three reasons:

1) Channel coding over an entire L3 message provides time interleaving between L2 frames, to better handle bursty error conditions.
2) The side information from Layer 2 can be very reliable. It will with extremely high degree of probability indicate whether a Layer 2 frame is correct or non-correct.
3) There are no more powerful block codes than Reed-Solomon codes; i.e. no code has a larger minimum distance.

The complexity of erasure decoding of RS codes is relatively low. Further information about Reed-Solomon codes may be found in "Error Control Coding", Shu Lin and Daniel J. Costello, Prentice-Hall, ISBN 0-13-283796-X", the disclosure of which is hereby incorporated herein by reference.

The benefit of higher layer coding can increase with message length. This is due to the interleaving effect over multiple Layer 2 frames. For a given relative amount of redundancy, a longer message can better accommodate the statistical effect of consecutive L2 errors.

Only a small amount of redundancy, i.e. the increase in Layer 3 message length due to extra Layer 2 frames may be added, in order to substantially improve the Layer 3 message detection.

Constructing a RS Code for a Layer 3 Message

The broadcast channel of IS-136 (S-BCCH) is used as an exemplary implementation. Since the maximum length of a Layer 3 message is 255 octets, a GF(256), i.e. 8-bit symbols, will be used in the following. The very first Layer 2 frame contains overhead such that the receiver can identify the start and the length of the Layer 3 message, see FIG. 18. The remaining Layer 3 payload is transmitted using a Layer 2 Continue frame, see FIG. 19. The maximum length of a Layer 3 message is 255 octets, see FIG. 17. For longer messages, several Continue frames are used. The length of the payload in the Begin frame is 84 bits. The first 10 Layer 3 octets are transmitted in the Begin frame, 4 bits of the 11$^{th}$ octet is transmitted in the Begin frame and the remaining 4 bits are sent in the first Continue frame. The length of payload in a Continue frame is 92 bits. There are (92-4)/8= 11 octets in the first Continue frame. In the second Continue frame there are 11 octets plus 4 bits. In the third Continue frame there are 11 new octets and the remaining 4 bits from the non-completed octet from the previous Layer 2 frame. The 92 bits in a Continue frame will thus only carry data for one incomplete symbol. Thus, any Layer 2 Continue frame in error carrying a Layer 3 message started with a Begin frame may affect at the most 12 octets. However, if the Layer 3 message did start with a Transition frame, see FIG. 20, a Continue frame may carry a non-completed octet from the previous frame and end with a non-completed octet. Thus, the most amount of affected symbols by a single L2 erroneous frame for a Layer 3 message started with a Transition frame is 13 octets.

If the coding redundancy is considered part of the Layer 3 message, any redundancy will correspondingly reduce the maximum amount of Layer 3 net payload. A GF(256) RS code will accommodate the maximum length Layer 3 message for this scenario since a q=256 RS code can be constructed with the length of the codeword being 255. A Layer 2 frame is either correctly received or may contain several symbol errors. These erroneous symbols can typically not be identified. It takes two redundancy symbols to correct any non-identified (no-erasured) symbol whereas it only takes one redundancy symbol to recover an erasured symbol. Thus, the number of redundancy symbols should preferably be z*13 in order to recover data from z number of erroneous Layer 2 frames and allow for a message to start with a Transition frame. Any other value may only reduce the net throughput without giving much benefit in the decoding process. Furthermore, error correcting decoding generally is much more complex than erasure decoding.

The number of Layer 2 frame for a 255 octet Layer 3 message is:

Solve y for: 84+(y-1)*92>=255*8, y=23.

The 23$^{rd}$ frame is carrying 68 bits from this message.

If another maximum length Layer 3 message is started in the last Layer 2 frame using a Transition frame, the number of Layer 2 frames for this message is:

Solve y for: 77-68+(y-1)*92>=255*8, y=24.

The 24$^{th}$ frame is carrying 7 bits from this message.

The number of extra symbols may be indicated (as described earlier) to the receiver by: (1) explicit in L3 header; (2) out-of-band signaling; or (3) implicit defined e.g. by the service type indicator sent outside the L3 message.

Furthermore, due to the varying amount of symbols that may be used to correct a certain number of L2 frames, the exact amount of redundancy symbols provided could be implicitly provided in how the message was packed into L2 frames. For example, if the L3 message was sent starting with a begin frame, the exact amount of redundancy symbols would be z*12 and if a transition frame was used to start sending this message the amount of redundancy symbols would be z*13. The value of z can be provided as described above, e.g. transmitted out-of-band. Thus, the receiver may first determine the value for z. Then it would by knowing how many symbols of information, including non-complete symbols, is sent in the Layer 2 frame which carries the most symbols determine exact how many redundancy symbols is provided. Another alternative is to always assume the limiting case, i.e. set the number of redundancy to z*13 for the example above.

Calculation of Probability of Correct Received Message (CRM)

The probability of CRM is calculated as:

$$\sum_{j=0}^{m} (n+m)(1-WER)^{n+m-j} *(WER)^{j}$$

where
n=number of net L2 frames, m=number of redundancy frames,

WER=Layer 2 Word Error Rate. As used herein, the term "word" is synonymous with "frame". The total layer 3length is n+m L2 frames.

In these calculations, the assumption is made that Layer 3 message may require up to at least 24 Layer 2 frames and that the redundancy is put in additional frames. Depending on how the protocol is defined (e.g. maximum length of a Layer 3 message), this may not be possible. Furthermore, it is assumed that to erasure correct a Layer 2 frame, one and only one additional Layer 2 frame is needed. As was demonstrated above, the number of redundancy symbols needed to correct any Layer 2 frame may not exactly fit into a single Layer 2 frame. However, to assess the error sensitivity vs. message length, the validity of this assumption may not be critical. Furthermore, the error event of L2 frames is assumed to be independent. The validity of this assumption may depend on the vehicular speed and the separation in time, if any, between L2 frames carrying the same L3 message. A more detailed study may include computer simulations where the vehicular speed and the timing of L2 frames transmission is modeled.

Figure 21:
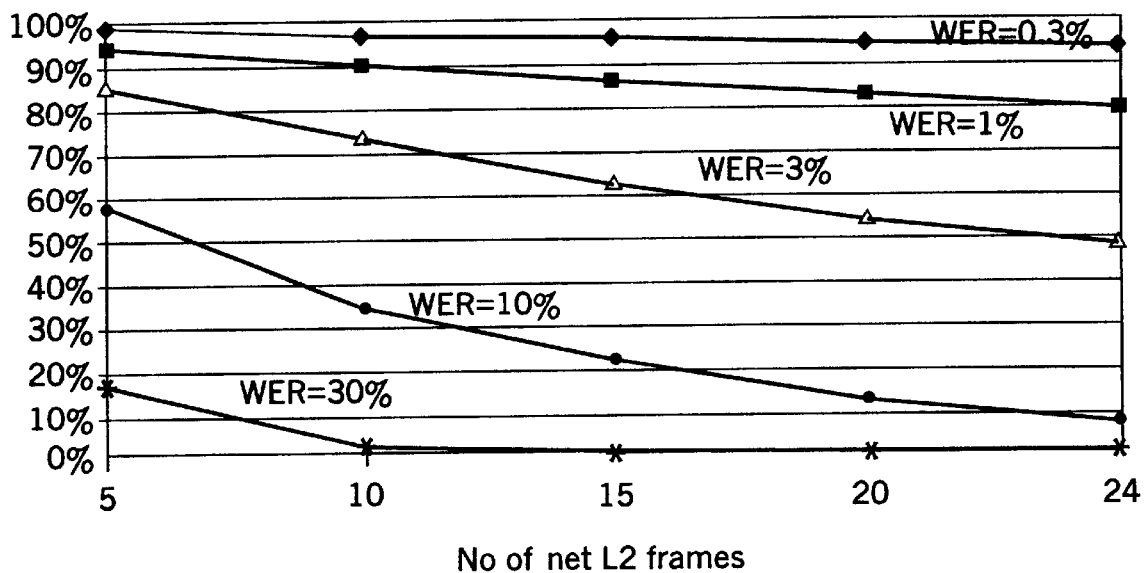
FIG. 21 shows the probability for Correct Received Message (CRM) vs. number of Layer 2 frames (Word) in a message for various Word Error Rates (WER)

Table 1 shows the result of Layer 3 CRM for message of length 5,10,15,20 and 24 Layer 2 frames and the Layer 2 WER are 0.3%, 1%, 3%, 10% and 30%. No Layer 3 coding is performed (as per current IS-136). FIG. 21 is a graphical representation of Table 1.

TABLE 1

Probability of Correct Received Layer 3 Message no coding

| No of L2 frames | WER = 0.3% | WER = 1% | WER = 3% | WER = 10% | WER = 30% |
|---|---|---|---|---|---|
| 5 | 99% | 95% | 86% | 59% | 17% |
| 10 | 97% | 90% | 74% | 35% | 2.8% |
| 15 | 96% | 86% | 63% | 21% | 0.5% |
| 20 | 94% | 82% | 54% | 12% | 0.08% |
| 24 | 93% | 79% | 48% | 8% | 0.02% |

Figure 22:
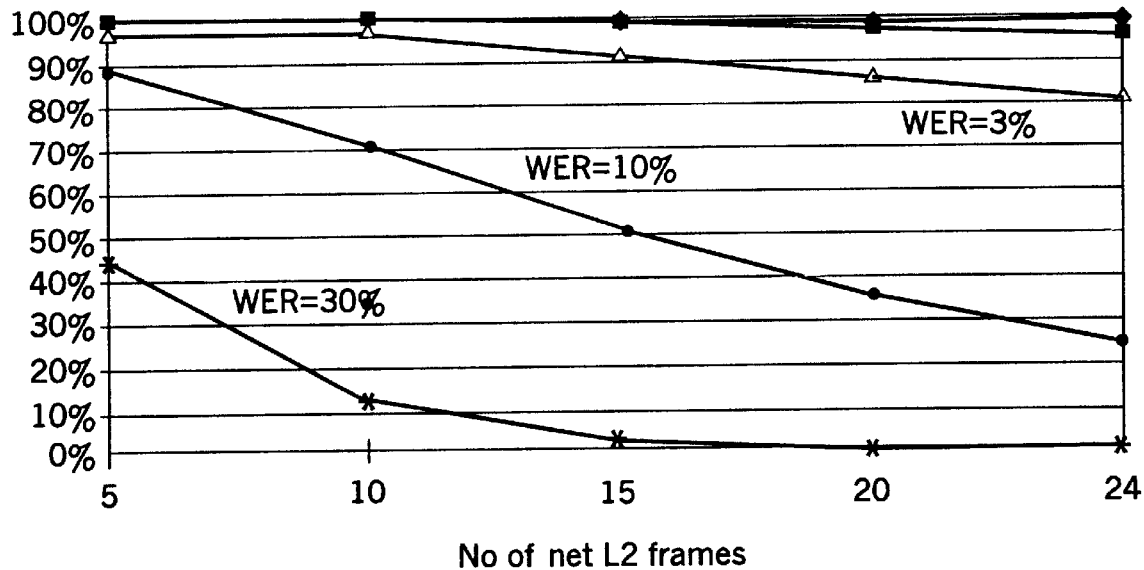
FIG. 22 shows the probability for Correct Received Message (CRM) vs. number of Layer 2 frames (Word) in a message for various Word Error Rates (WER), where one frame of Reed-Solomon coding is added.

Table 2 shows the CRM when one extra Layer 2 frame with redundancy symbols is added to the Layer 3 message. The number of Layer 2 frames is increased by one compared with Table 1. FIG. 22 is a graphical representation of Table 2.

TABLE 2

Probability of Correct Received Layer 3 Message
Coding: 1 redundancy frame

| No of L2 frames | WER = 0.3% | WER = 1% | WER = 3% | WER = 10% | WER = 30% |
|---|---|---|---|---|---|
| 6 | 100% | 99.8% | 96.2% | 88.6% | 42% |
| 11 | 100% | 99.4% | 95.9% | 69.7% | 11.3% |
| 16 | 99.6% | 98.8% | 91.8% | 51.5% | 2.6% |
| 21 | 99.8% | 98.1% | 87.0% | 36.5% | 0.56% |
| 25 | 99.7% | 97.4% | 82.8% | 27% | 0.15% |

Figure 23:
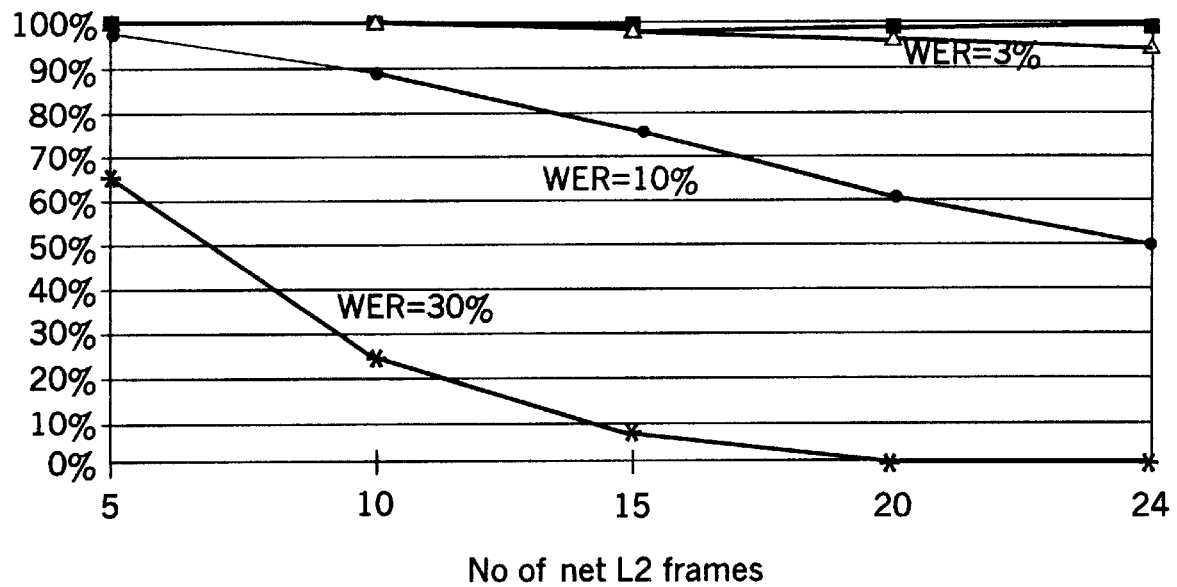
FIG. 23 shows the probability for Correct Received Message (CRM) vs. number of Layer 2 frames (Word) in a message for various Word Error Rates (WER), where two frames of Reed-Solomon coding are added.

Table 3 shows the CRM when two extra Layer 2 frames with redundancy symbols are added to the Layer 3 message. The number of Layer 2 frames is increased by two compared with Table 1. FIG. 23 is a graphical representation of Table 3.

TABLE 3

Probability of Correct Received Layer 3 Message
Coding: 2 redundancy frame

| No of L2 frames | WER = 0.3% | WER = 1% | WER = 3% | WER = 10% | WER = 30% |
|---|---|---|---|---|---|
| 7 | 100% | 100% | 99.9% | 97.4% | 64.7% |
| 12 | 100% | 100% | 99.5% | 88.9% | 23.9% |
| 17 | 100% | 99.9% | 98.7% | 76.2% | 7.7% |
| 22 | 100% | 99.9% | 97.3% | 62.0% | 2.1% |
| 26 | 100% | 99.8% | 95.8% | 51.1% | 0.67% |

Table 4 is an extract of tables 1,2& 3 for Layer 3 pay-load length of 24 Layer 2 frames for a WER of 3% and 10% respectively (the actual number of layer 2 frames is 24,25 and 26 respectively).

TABLE 4

Probability of Correct Received L3 Message

| RS Coding | WER = 3% | WER = 10% | increase of L3 message length | L3 coding rate |
|---|---|---|---|---|
| none | 48% | 8% | 0 | 24/24 = 1.0 |
| 1 L2 frame | 82.8% | 27% | 1/24 = 4.2% | 24/25 = 0.96 |
| 2 L2 frame | 95.8% | 51.1% | 2/24 = 8.3% | 24/26 = 0.92 |

Thus, for an increase of the Layer 3 message length of 8.3% the CRM increases from 10 48% to 95. 8% for WER=3% and from 8% to 51.1% for WER=10%.

The redundancy symbols of the RS code are provided in extra Layer 2 frames ("systematic code"). Hence, the wireless terminal can ignore the redundancy if it so desires (optional facility). The "cost" for a wireless terminal not implemented to make use of the RS encoding is the increase in message length, i.e. a slight decrease 15in throughput. A wireless terminal implemented with the RS capability will in most cases experience a net increase in usable throughput even for rather low WER if the Layer 3 message is long.

The wireless terminal preferably examines all L2 frames with respect to CRC check if any of the L2 frames are in error. If there are no errors, higher layer decoding (e.g. Layer 3 ) is not necessary (systematic coding). If the number of erroneous layer 2 frames are greater than the number of correctable frames, the wireless terminal cannot deliver a correct higher layer frame and generally must wait for the next occurrence of at least some of the frames in error. If the number of erroneous layer 2 frames is less or equal to the number of correctable frames. The wireless terminal can decode with (almost) guaranteed successful result. Alternatively, the wireless terminal can ignore decoding and wait for the next occurrence of the erroneous Layer 2 frames.

Alternate Coding Formats And Associated Channel Management

The current S-BCCH Layer 2 frame in ANSI 136 is protected by a rate ½ convolutional code. When higher layer coding is available, it may be preferred to reduce the channel coding of each L2 frame and provide correspondingly more redundancy to the higher layer coding. This is typically the case when the amount of lower layer coding was determined assuming no higher layer coding as for the conventional ANSI 136 broadcast channel.

For future services, the opportunity exists to define a new L2 frame containing more payload bits and corresponding less redundancy. However, this alternate architecture should preferably be able to co-exist with the current defined S-BCCH on the same control channel. Thus, older wireless terminals should not be confused when reading the S-BCCH channel by the presence of the new S-BCCH slot definition. The old and new slot formats could be multiplexed on the S-BCCH channel such that this concern is mitigated. If the wireless terminal successfully can find the descriptor of the S-BCCH, the BATS service in ANSI-136, old wireless terminals would then only try to read old services (i.e. services which it is designed to understand) at a location (in time) indicated by the descriptor channel. The old wireless terminals would omit reading the new services. If the new services are sent in distinct time slots in the superframe, these time slots may be encoded differently than the old S-BCCH encoding format. However, the ability to mix old and new formats may depend on the flexibility of the descriptor channel to pinpoint when the transmission of the various services occurs in time. Secondly, while the old wireless terminal is searching (synchronizing to) the descriptor channel, it must not be confused when it encounters a S-BCCH time slot which uses a Layer 2 channel coding method different then expected. It should be noted that an old wireless terminal would just determine that it could not decode a S-BCCH slot of the newer format type based on the CRC check and proceed reading further slots until it can deduce where the descriptor channel is located in the time-multiplexed structure. However, depending on specific wireless terminal implementation, if a wireless terminal encounters multiple successive L2 frames which it determines are in error it may give up on the task of finding the descriptor channel.

If there are any predefined rules where to locate the descriptor channel, the concern indicated above with old wireless terminal may be reduced. For example, if the descriptor channel always must start in a first S-BCCH slot in a superframe and the first S-BCCH slot in a superframe never is allocated to the services using the new format, the ability for an old wireless terminal to find the descriptor channel without being confused by the new format may be enhanced.

Another solution is to provide for a new logical Broadcast SMS channel, denoted S2-BCCH in this context. An old wireless terminal would look for the number of S-BCCH slots and its location in the superframe in the F-BCCH. A new information element can be provided for the new wireless terminals indicating the number of S2-BCCH slots in the superframe. An old wireless terminal would never attempt to read the S2-BCCH slots.

Figure 24:
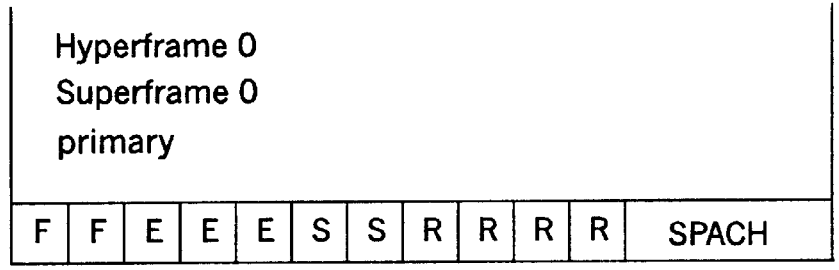
FIG. 24 illustrates a superframe structure that can be used to implement the present invention.

FIG. 24 shows a proposed new superframe format as perceived by an old wireless terminal. In FIG. 24, each slot allocation of the non-SPACH slots are indicated separately as opposed to FIG. 15, which only illustrates the order of the channels. There are 2 F-BCCH slots, 3 E-BCCH slots, 2 S-BCCH I slots and 4 Reserved slots in this example.

FIG. 25 shows the proposed new superframe format using the same configuration as in FIG. 24, as perceived by a new wireless terminal. The difference is that the 4 Reserved slots as perceived by an old wireless terminal is now understood to be 3 S2-BCCH slots and one Reserved slot (R2)

This mechanism to future proof the technology is already provided in ANSI-136 which has defined a logical channel denoted "Reserved". The old wireless terminal can still correctly identify the start of the non-BCCH slots (i.e. the SPACH slots) because the old wireless terminal is able to read the number of Reserved slots in a superframe immediately following the S-BCCH channel. This technique is described in U.S. Pat. No. 5,751,731 to the present inventor, entitled "Simplifying Decoding Of Codewords In A Wireless Communication System", which is commonly assigned the disclosere of which is hereby incorporated herein by reference in its entirety.

The new wireless terminal would see two information element in the BCCH in addition to the number of S-BCCH slots, the number of S2-BCCH slots per superframe (implicit following the S-BCCH slots unless otherwise indicated) and a second information element which in this context is denoted Reserved-2. The existing information element indicating the number of Reserved slots should be set to the sum of the number of S2-BCCH slots and Reserved-2 slots. Thus, this allows the same control channel to be further enhanced with future (beyond S2-BCCH) new logical channels occupying a set of distinct time slot in the superframe.

Alternative Architectures Of The Broadcast Channel Since the coding on the application layer is so powerful, as explained earlier, it may be preferred to reduce the amount of coding on each Layer 2 frame and increase the amount of coding of the application layer. For example, if the coding of the L2 frames is reduced from rate ½ to rate ¾ and a higher layer coding of rate ¾ is applied, the net coding rate is ¾*¾=9/16 which is slightly higher throughput than the existing format (=½). It is expected that such a reallocation of redundancy can improve the decoding performance of longer messages in-spite of having slightly less overall amount of redundancy. The increased WER of L2 frames, resulting from the coding rate change from rate ½ to rate ¾, may be more than compensated by the second decoding step.

A further improvement of throughput can be implemented by performing tail-biting rather then providing tail bits when encoding the Layer 2 frame. For an explanation of tail-biting vs. tail bits, see U.S. Pat. No. 5,673,291. This may, for the convolution code used currently in ANSI 136, increase the payload in a L2 frame with 5 bits. However, the decoding may become somewhat more computationally intensive. This technique may be, however, independent of the aspects of providing coding at a higher layer.

In U.S. Pat. No. 5,603,081 entitled "Method For Communicating In A Wireless Communication System" to Raith et al., and U.S. Ser. No. 08/544,492 to Raith et al., filed Oct. 18, 1995, the disclosure of both of which are hereby incorporated herein by reference in their entirety, a concept of Master and Slave (M/S) of a control channel is disclosed. On a first channel, the Master, all logical channels as pertaining to a control channel are found, for example, the logical channels according to FIG. 16. The Slave channel only carries point-to-point messages and specifically no broadcast channels. This can allow the growth of the call set-up capacity by expanding into a second control channel without carrying over the overhead of repeating the broadcast channel. The wireless terminals hashed or allocated to a Slave channel can acquire their broadcast data from the master channel. With the introduction of an alternative broadcast format of the present invention, the M/S concept can be modified to allow the new broadcast channel to reside on one or more Slaves. The "old" broadcast information, both system information found on F and E-BCCH and "existing" broadcast services for "old" and "new" wireless terminals can be placed on the Master channel. This can allow for more bandwidth for the broadcast services, for example carrying a stock quote service as described above, without severe service impact of correspondingly reducing the bandwidth for the other logical channels. For example, the logical channels on a Slave control channel may contain:

S-BCCH and SPACH or;

S-BCCH, SPACH and Reserved

Information on the Master BCCH can indicate the presence of a Slave control channel, type of channels present and the bandwidth allocation for proper identification (slot number in a TDMA system, code in a CDMA system).

FIG. 26 illustrates an exemplary implementation using the ANSI 136 example. The DCCH is allocated a full rate channel, i.e. every third slot in ANSI 136. This channel serves both old and new wireless terminals. It is the Master DCCH. A Slave channel is introduced as, in this example, a half-rate channel, i.e. every 6th time slot. The corresponding half-rate channel is assigned to a half-rate traffic channel (TCH2) e.g. a voice call to user1. The remaining bandwidth on this frequency is allocated to a full-rate traffic channel (TCH2), allocated for example to a data service for user2.

Note that the Slave channel can be a full-rate, double rate etc. channel. Multiple independent Slaves are also possible. The Slave channel can furthermore be allocated to a different frequency than the Master DCCH. A difference between a multi-rate DCCH and a multiple channel DCCH is, for example, that for the case of multiple channel DCCH, the wireless terminal will be assigned or assigned itself to one particular channel based for example on its identity (e.g. MIN or IMSI). Once assigned to the Master or a particular Slave DCCH, the wireless terminal will only read and transmit data on that particular DCCH with an exception possibly being common BCCH information. A multi-rate DCCH implies that a wireless terminal may read and/or transmit data from the entire envelope (e.g. time slots) of the multi-rate channel.

FIG. 27 illustrates a channel allocation with a Master DCCH and two Slave DCCH. The wireless terminal can determine based on its identity and information in the BCCH on the Master DCCH, to which DCCH the wireless terminal will assign itself. The system can optionally also reassign the wireless terminal by sending such a command in a message, for example as part of the Registration procedure.

The Slave DCCH may contain, in addition to the SPACH channels, a broadcast channel. The ANSI 136 standard includes a service named Broadcast Teleservice Transport which can indicate the presence, location (in time) and the subject mater (e.g. service type). The descriptive information on the Master channel could also include information about the content on the Slave channels. Another alternative is to indicate on the master channel the existence of further S-BCCH channels on the Slave channel(s) and then provide local information about subject, message length and when the message starts etc.

The reception performance of the broadcast channel can be indicated to the user. It is known to display the signal strength of a received signal. The correct/not correct indication of each Layer 2 frame can be averaged over time (low-pass filtered). The correct/not correct indication of a Layer 3 message or any combination of indications from various layers can be used. The use of a CRC in any of the layers used to send the application message is typically a reliable indication whether the data is correct or not. A graph showing the net throughput can be displayed. Since multiple cycles may need to be received before the payload is acquired in full, the time to acquire the payload generally is dependent on the channel quality. The receiver knows how much data is still required to be fetched before it can deliver the payload (e.g. to display it on a screen or send the payload to a companion device). This information together with the current channel quality, for example estimated as described above, can be used to predict when the payload is ready for delivery. A clock or "remaining time" indicator can be displayed to the user while the receiver is waiting for the remaining data. The user may use the information from the presented performance (e.g.% net throughput, estimated time before ready) to find a better spot for the antenna in order to improve the reception performance.

CRM Calculation For Alternate Coding Format

Let a reference L3 message occupy 20 L2 frames. Define an alternate architecture by applying a rate ¾ convolutional code on each L2 frame and code the L3 payload with a rate ¾ RS code. The effective rate is ¾*¾=9/16≈½. The reference message carries payload corresponding to n1=n_gross/rate uncoded amount of L2 frame data, where n1=20*½=10 L2 frames. The alternate message then uses n2=n1/(¾)=13.5 Layer 2 net L2 frames. Set n2 to nearest higher integer, i.e. n2=14 L2 frames. The number of equivalent uncoded L2 frames which corresponds to the payload amount is 14*¾= 10.5. Now set the total number of L2 frames equal for the reference and alternate message, i.e. equal to 20. There is room for 6 L2 frames of redundancy for the alternate message. The coding rate for the RS code then becomes 14/20=0.7. This is somewhat more coding then the initial (0.75) goal. The alternate message carries more payload then the reference message (10.5 vs. 10"units").

Thus, the alternate message carries somewhat more information (10.5/10=5%), occupies 14 L2 frames for the payload, is protected by 6 redundancy frames and uses the same amount of gross L2 frames (20). Thus, the time to send the alternate message is identical to the reference message but contains 5% more payload. The CRM for the alternate message can be calculated and again for simplicity assume independent L2 error events. The CRM for the uncoded reference message and with one and two extra redundancy frames from Table 1,2 and 3 is also provided as Table 5:

TABLE 5

Probability of Correct Received L3 Message

| conv. coding | RS Coding | WER = 3% | WER = 10% | WER = 30% | increased bandwidth |
|---|---|---|---|---|---|
| rate ½ | none | 54% | 12% | 0% | 0% |
| rate ½ | 1 L2 frame | 87% | 37% | 0.6% | 1/20 = 5% |
| rate ½ | 2 L2 frame | 97% | 62% | 2.1% | 2/20 = 10% |
| rate ¾ | 6 L2 frames | 100% | 99.8% | 62% | 0% |

It can be seen from Table 5 that the alternate message is more often correctly received at 30% L2 WER then the uncoded reference message at 3% L2 WER. The CRM is equal for the alternate coding at 30% WER and reference message coded with two extra redundancy frames at 10% WER. However, the alternate message will generally experience a higher WER because of the lower protection by the convolutional coding. If the WER for a rate ¾ convolutional code is lower than approximately 30% at a signal to noise ratio (SNR) where the WER for a rate ½ code is 3%, the alternate architecture is performing better. If the WER for a ¾ code at a Signal-to-Noise Ratio (SNR) for which a rate ½ code results in 10% WER is not higher then 30%, the alternate architecture is performing better. The first test can be answered yes based on experience. However, for the second test it may be desirable to perform computer simulations in which the particular embodiment, e.g. ANSI 136, is to be modeled.

Another alternate architecture is to have no convolutional coding and only for example a rate ½ to rate ⅔ RS code. Performance assessment may be evaluated by computer calculations. For the existing ANSI 136 coding, experience shows that the L2 WER typically is less then 10%. Poor channels may result in higher WER. This knowledge may allow selection of relevant WER for the CRM calculation. There may be no equally simple understanding of what the symbol error rate over 8 bits would be, for the SNRs of interest, and hence computer simulations may be performed. However, the power of a single long code rather then multiple shorter codes would indicate that such an architecture may be competitive at least if error correcting decoding is used. A convolutional code over the entire L3 message and interleaved over all L2 frames and no coding at L2 would most likely perform better than L2 coding only due to the increased interleaving effect.

However, the combination of an inner convolutional code on smaller blocks (i.e. a single L2 frame), the provision of an reliable indicator whether the inner code could correctly decode the block (e.g. an CRC) and an outer RS code has several advantages:

First, with respect to a single L3 RS code, an inner convolutional code can benefit from soft decoding which can enhance the performance. Soft RS error correcting decoding may not be feasible and the alternative of using the soft information for erasure decoding only may not provide the same reliable side information as the preferred architecture. This format may make the reading of the L2 header, which may be used to synchronize to the message cycles, less reliable (no L2 coding) or may require that the wireless terminal know the message length and wait for the redundancy frames to arrive before examining the L2 headers. However, this problem can be solved by providing overhead information such as a frame number count in a separate encoded block in each Layer 2 block. For this scenario the Layer 2 may be considered to include of this header and no Layer 2 for the payload.

Second, a single L3 convolutional code, which can fully benefit from soft error correcting decoding, may result in the entire message being accepted or rejected. For broadcast services, the same information will be repeated. Thus, the receiver can store the correctly received L2 frames and if the overall decoding was not successful it can store the correct (according to the CRC) L2 frames and wait for the next occurrence of the incorrect L2 frames until it can decode the L3 message. This may not be possible unless the message is broken up in pieces inside L3 and adding a CRC for each piece inside L3. For this scenario too, the L2 header can be encoded and placed in a separate field in the physical layer. However, from a wireless terminal perspective, this may not be necessary since a convolutional code can be decoded without knowing the start or the end of the encoding block. However, it may require inserting the "L2" overhead inside L3 which may violate the notion of layering. Another implementation would be to store the entire message that could not be decoded and perform joint decoding of the stored and newly arrived message (soft combining). This however, may require excessive storage (entire message(s) and associated soft information). The aspect of not be able to pin-point which segment is in error may increase the storage requirement.

Number Of Cycles Before A Correct Message Is Received

In a broadcast channel the messages are typically repeated in a never-ending loop unless they become obsolete. Thus, if the wireless terminal stores the correctly received L2 frames from each event (cycle), it only needs to capture the erroneously received frames in the following cycle(s) until it has received all L2 frames correctly.

If the protocol allows the receiver to identify the frames and therefore only have to reread the erroneous frames in the following cycle, the performance may be substantially enhanced compared with rereading the entire message. The results in Tables 6–10 assume this capability. However, the delay in acquiring the message may increase for each additional cycle used to capture the message. The feasibility of using multiple cycles to acquire a message may depend on the type of service. The user may be most sensitive to the power-on scenario when the user may expect fast presentation of the service content.

Table 6 shows the probability of requiring a particular number of cycles before a L3 message is correctly received as a function of the L2 WER. No higher layer channel coding is included. The total number of L2 frames is 20. Table 7 shows the cumulative probability of Table 6.

TABLE 6

Probability (%) of correct received
L3 message after a given cycle vs. L2 WER
(20 L2 frames)

| cycles | 1% | 3% | 5% | 10% | 20% | 30% | 35% | 40% |
|---|---|---|---|---|---|---|---|---|
| 1 | 81.79 | 54.38 | 35.85 | 12.16 | 1.15 | 0.08 | 0.02 | 0.0037 |
| 2 | 18.01 | 43.84 | 59.27 | 69.63 | 43.05 | 15.08 | 7.31 | 3.06 |
| 3 | 0.2 | 1.73 | 4.63 | 16.23 | 38.26 | 42.68 | 34.30 | 23.58 |
| ≧4 | ≈0 | 0.05 | 0.25 | 1.98 | 17.54 | 42.16 | 58.37 | 73.36 |

TABLE 7

Probability (%) of correct received
L3 message within a given number of cycles vs. L2 WER
(20 L2 frames)

| cycles | 1% | 3% | 5% | 10% | 20% | 30% | 35% | 40% |
|---|---|---|---|---|---|---|---|---|
| 1 | 81.5 | 54.4 | 35.9 | 12.2 | 1.2 | 0.08 | 0.02 | 0.0037 |
| 2 | 99.8 | 98.2 | 95.1 | 81.8 | 44.2 | 15.2 | 7.3 | 3.1 |
| 3 | ≈100 | ≈100 | 99.8 | 98.0 | 82.5 | 57.8 | 41.6 | 26.6 |

Table 8 shows the probability of requiring a particular number of cycles before a L3 message is correctly received as a function of the L2 WER. One frame of higher layer channel coding is included. The total number of L2 frames is 20+1=21. Table 9 shows the cumulative probability of Table 8.

TABLE 8

Probability (%) of correct received L3 message after
a given cycle vs. L2 WER (21 L2 frames).
One RS frame

| cycles | 1% | 3% | 5% | 10% | 20% | 30% | 35% | 40% |
|---|---|---|---|---|---|---|---|---|
| 1 | 98.15 | 87.01 | 71.70 | 36.47 | 5.76 | 0.56 | 0.14 | 0.033 |
| 2 | 1.85 | 12.98 | 28.18 | 61.68 | 73.80 | 41.90 | 25.13 | 12.82 |
| 3 | ≈0 | ≈0 | 0.08 | 1.55 | 18.76 | 46.44 | 51.97 | 47.86 |
| ≧4 | ≈0 | ≈0 | 0.04 | 0.3 | 1.7 | 11.1 | 32.8 | 39.3 |

TABLE 9

Probability (%) of correct received L3 message within
a given number of cycles vs. L2 WER (21 L2 frames).
One RS frame

| cycles | 1% | 3% | 5% | 10% | 20% | 30% | 35% | 40% |
|---|---|---|---|---|---|---|---|---|
| 1 | 98.2 | 87.0 | 71.7 | 36.5 | 5.8 | 0.6 | 0.14 | 0.033 |
| 2 | ≈100 | ≈100 | 99.9 | 98.1 | 79.6 | 42.5 | 25.3 | 12.9 |
| 3 | ≈100 | ≈100 | ≈100 | 99.7 | 98.3 | 88.9 | 77.2 | 60.7 |

Table 10 shows the probability of requiring a particular number of cycles before a L3 message is correctly received as a function of the L2 WER. One frame of higher layer channel coding is included. The total number of L2 frames is 20+2=22. Table 11 shows the cumulative probability of Table 10.

TABLE 10

Probability (%) of correct received L3 message after
a given cycle vs. L2 WER (22 L2 frames).
Two RS frames

| cycles | 1% | 3% | 5% | 10% | 20% | 30% | 35% | 40% |
|---|---|---|---|---|---|---|---|---|
| 1 | 99.87 | 97.28 | 90.52 | 62.00 | 15.45 | 2.07 | 0.61 | 0.16 |
| 2 | 0.13 | 2.72 | 9.48 | 37.86 | 78.96 | 66.19 | 47.76 | 29.14 |
| 3 | ≈0 | ≈0 | 0.0014 | 0.11 | 5.31 | 28.08 | 41.13 | 47.21 |
| >4 | ≈0 | ≈0 | ≈0 | ≈0 | 2.4 | 3.7 | 10.5 | 24.5 |

TABLE 11

Probability (%) of correct received L3 message within
a given number of cycles vs. L2 WER (22 L2 frames).
Two RS frames

| cycles | 1% | 3% | 5% | 10% | 20% | 30% | 35% | 40% |
|---|---|---|---|---|---|---|---|---|
| 1 | 99.9 | 97.3 | 90.5 | 62.0 | 15.5 | 2.1 | 0.61 | 0.16 |
| 2 | ≈100 | ≈100 | ≈100 | 99.9 | 94.4 | 68.3 | 48.4 | 29.3 |
| 3 | ≈100 | ≈100 | ≈100 | ≈100 | 99.7 | 96.3 | 89.5 | 76.5 |

Performance Of Multiple Messages

Various services may use more payload than what can be fit into one single message. Previous examples showed a payload of 163,000 octets for a stock quote service (or about 16,300 if the technique in the above-cited U.S. Ser. No. 09/113,317 is used) and 2,500 octets for a data base for Intelligent Roaming respectively. Continuing using the ANSI 136 exemplary frame structures and message length, the number of Layer 3 messages to carry the payload given that a Layer 2 Continue frame can contain 11.5 octets are 163,000/11.5/20=1600 messages and 2,500/11.5/20=11 messages. The number of net Layer 2 frames is set to 20. Thus, there is an interest to assess the delivery performance of a service that uses multiple Layer 3 messages.

It should be noted that for some services the entire payload (all corresponding Layer 3 messages) need not be available before the content may be of relevance for an end-user. For example, with a well-designed protocol, a stock quote service can display the quotes that it has received while still waiting for a subsequent cycle for the messages that were not correctly received. This may require that the segmentation of the payload is performed such that the application can "synchronize" to an individual message without having all messages available. At the next cycle, where the underlying payload may have been updated (new quotes), the wireless terminal may display the new information and now updating the quotes for the symbols which were not updated in the previous cycle. In the limit, each stock quote is updated whenever there is a change in the quote and the corresponding data could be correctly received. In practice, given the segmentation of the payload, the minimum segment that can be interpreted may be based upon the segmentation of the payload in frames e.g. Layer 2 frames and Layer 3 messages. Thus, although the performance for a 1,600 long message may be very poor whenever the radio channel experience interference, the performance of that particular service may not necessarily be judged based on receiving all 1,600 messages correctly within a certain time.

The other example, downloading a data base, may require that all or nothing is updated in the wireless terminal, depending on the protocol design. Thus, the wireless terminal may need to wait until all messages are correctly received. Since the IR data base (roaming agreements) does not typically change very frequently, the data will be constant from cycle to cycle. Furthermore, it may not be considered important that the wireless terminal will correctly receive the very first cycle after an update of the data base. A few cycles of reading, where the receiver will fetch the Layer 2 frames until it gets a complete message set, may be considered satisfactory performance. These two services illustrate that there may be services requiring very long set of messages but also that the sensitivity of requiring multiple number of cycles before the wireless terminal has a complete set of new payload may need to be assessed for each service individually.

Figure 28:
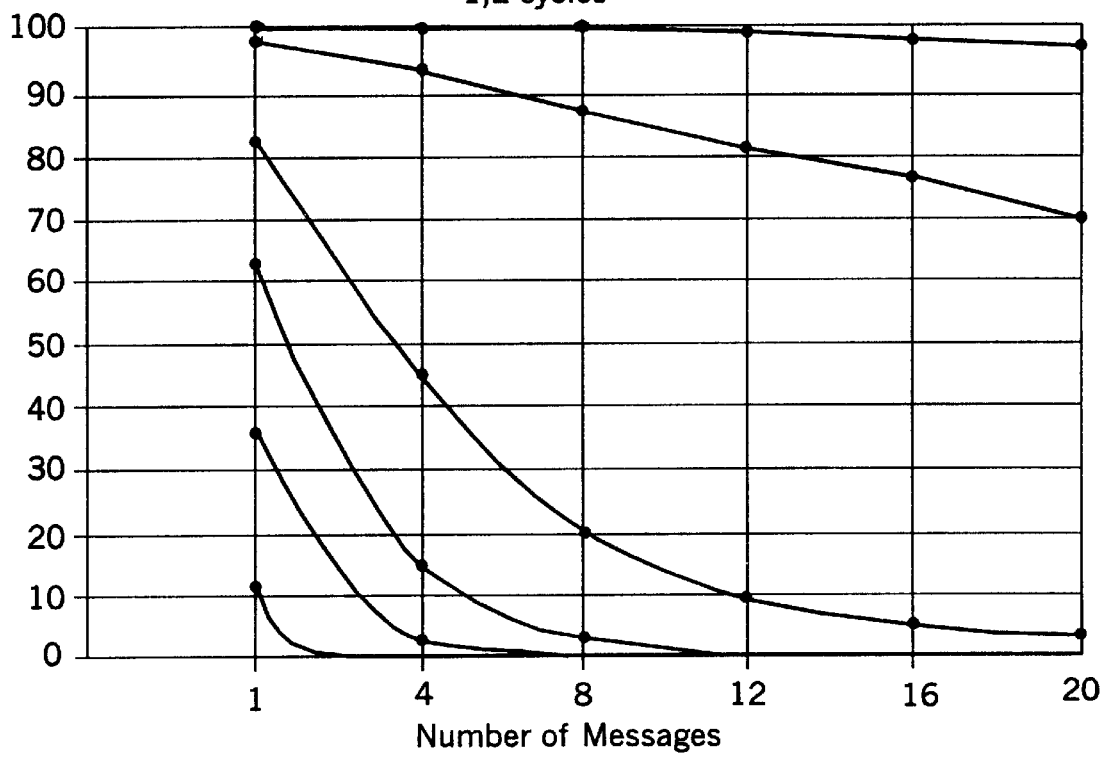
FIG. 28 shows the probability for correct receiving a message set vs. number of messages in payload for 10% WER after 1 and after 2 cycles for no. 1 and 2RS-coding.
Figure 29:
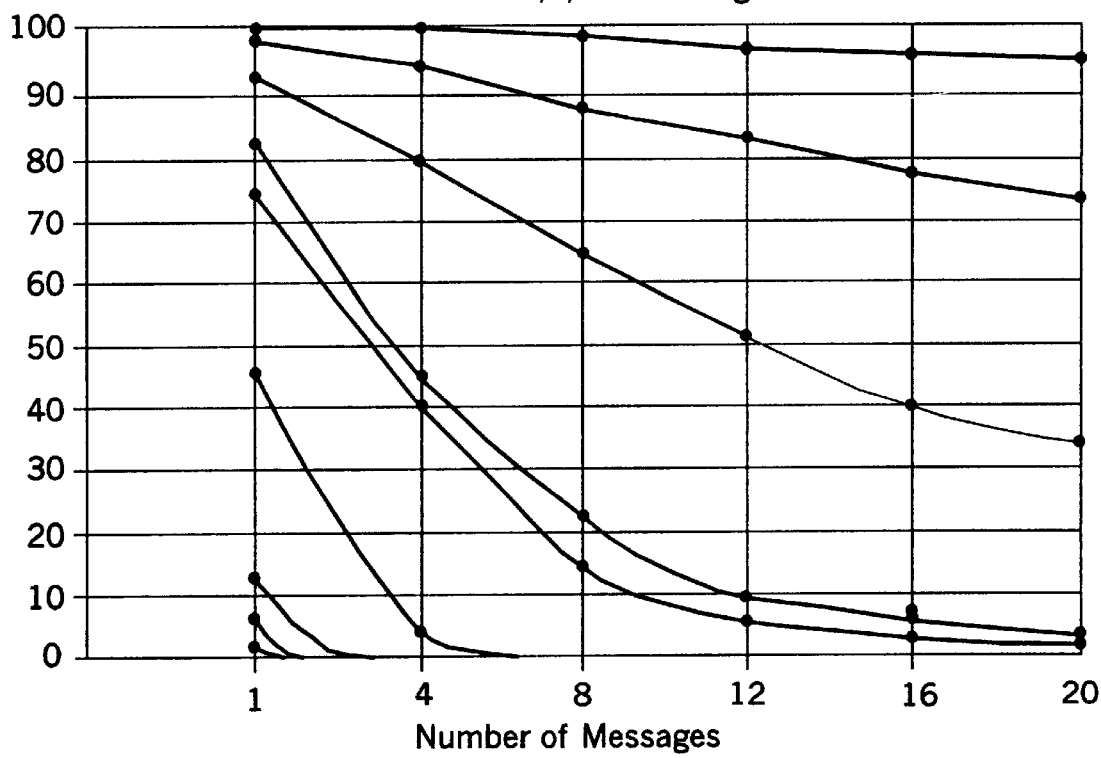
FIG. 29 shows the probability for correct receiving a message set vs. number of messages in payload for 20% WER after 1, after 2 and after 3 cycles, for no. 1 and 2RS-coding.

The performance of the exemplary implementation of coding has been calculated for 1 to 20 messages in the message set (application layer) for various Word Error Rates (Layer 2 frame error rate). The calculations are performed for 1,2 and 3 cycles. The number of net Layer 2 frames in each message is 20. FIG. 28 shows the Correct Received Message Set (CRMS) for WER=10% for 1 and 2 cycles. For each cycle, the performance for zero, one and two frames of RS coding is showed. FIG. 29 shows the result for 20% WER and 1,2 and 3 cycles. The CRMS performance increases dramatically for long messages with the number of cycles allowed. However, coding also improves the performance. It should be noted that the increase in time to deliver a service is 0%, 100%, and for 1, 2 and 3 cycles. The corresponding increase in time for reception for RS-coding is 0%, 5% and 10% for 0,1 and 2 frames of RS-coding. For example, in FIG. 29, the performance of 2-RS coding and 2 cycles is better than no coding and 3 cycles. Thus, although the later scenario may require an increase in time to receive the entire message of 200% the performance of the coding scenario is still better although only requiring 110% increase in time.

Figure 30:
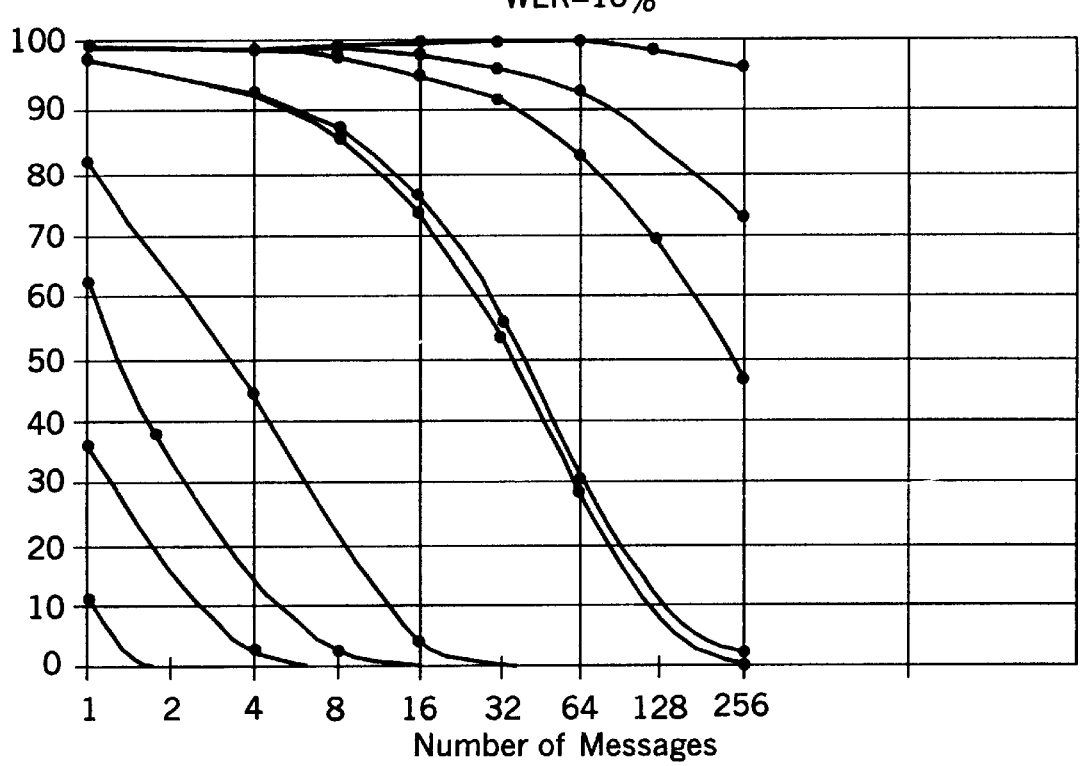
FIG. 30 shows the probability for correct receiving a message set vs. number of messages in payload for 10% WER after 1, after 2 and after 3 cycles, for no. 1 and 2RS-coding.
Figure 31:
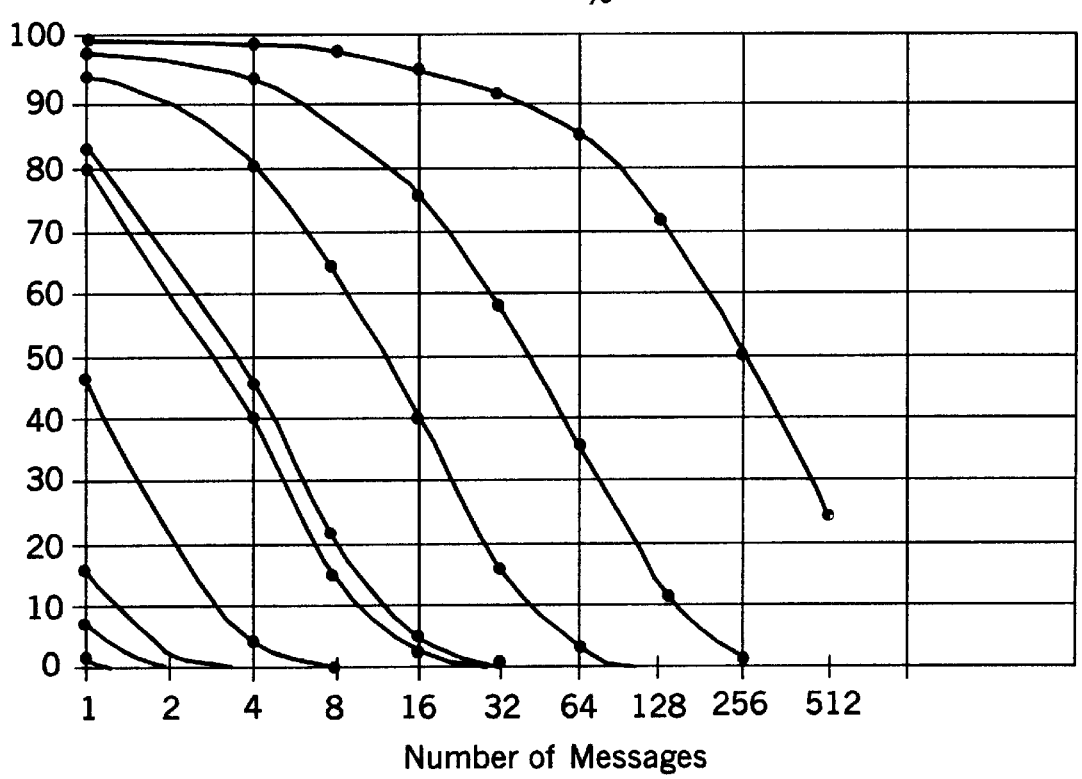
FIG. 31 shows the probability for correct receiving a message set vs. number of messages in payload for 20% WER after 1, after 2 and after 3 cycles, for no. I and 2RS-coding.

FIGS. 30 and 31 are similar to FIGS. 28 and 29, with the difference of showing the performance for up to 256 messages. The results illustrate that for long message sets, the combined use of reading during multiple cycles and inclusion of the proposed coding in Layer 3 can result in good performance. Coding alone, unless more than 2 frames of coding is included, may not result in satisfactory performance. See FIG. 30. Even for very few messages, the performance for a single cycle is very low. However, for long set of messages, e.g. 100, three cycles but no coding may not result in satisfactory performance. The inclusion of 2-RS coding improves the CRMS from about 20% to about 97% which illustrates the boost in performance by the inclusion of coding and allowing for more than one cycle of reading.

Figure 32:
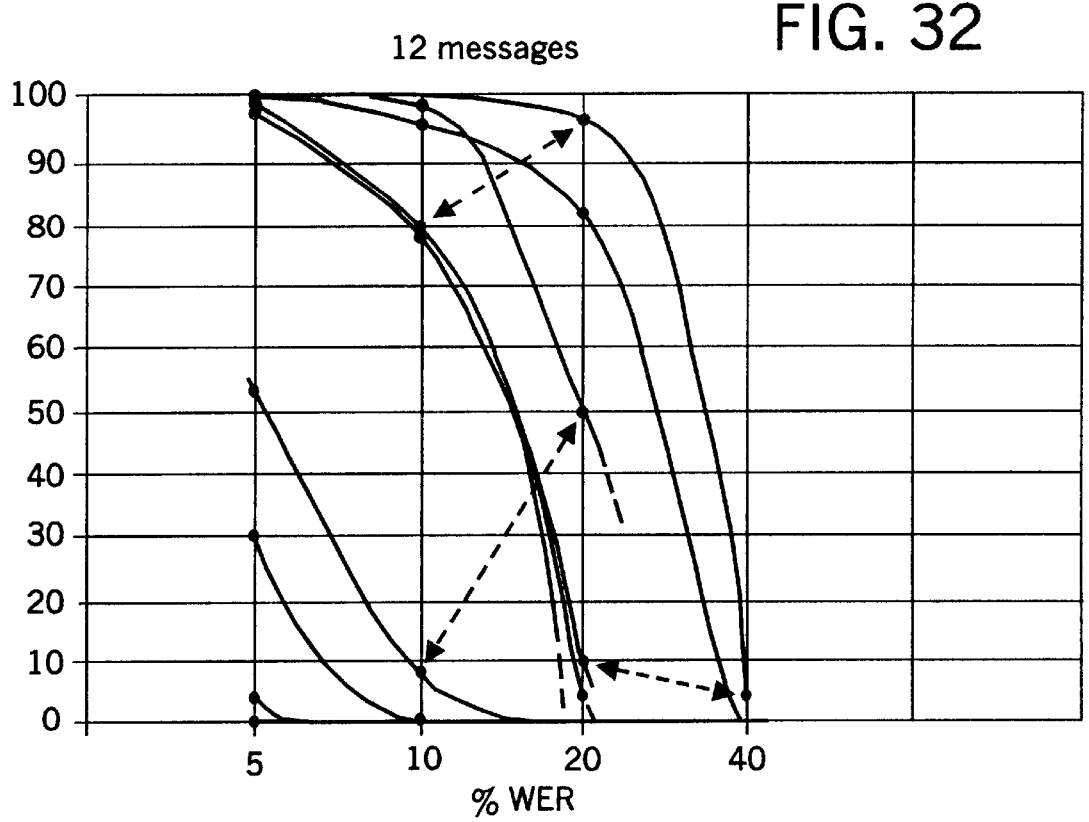
FIG. 32 shows the probability for correct receiving 12 message vs. WER after 1, after 2 and after 3 cycles, for no. 1 and 2RS-coding.
Figure 33:
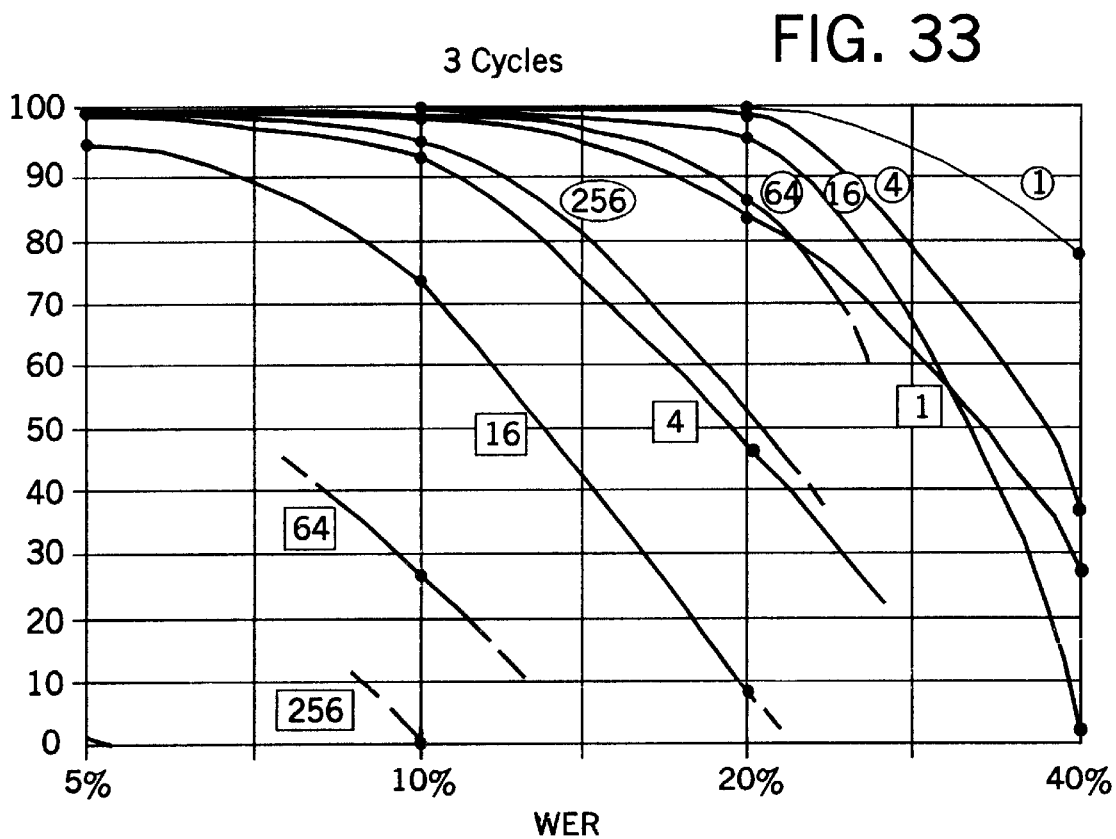
FIG. 33 shows the probability for correct receiving a set of message vs. WER after 3 cycles, no. 1 and 2RS-coding.

FIG. 31 shows the CRMS for 12 messages as a function of WER. This example may be representative for the IR service. FIG. 32 illustrates the CRMS performance after 3 cycles as a function of WER for various message set lengths. Results for no coding and 2-RS coding are shown.

The expected time for service delivery can be calculated as:

$$T = \Sigma Tc * c * Pc$$

where Tc is the time of a cycle, c is the number of cycles required and Pc is the probability of requiring c cycles. Pc for FIGS. 28–33 are found in Tables 6, 8, 10, 12, 14, 16, 18, 20, 22, 24 and 26. The calculations are limited to 3 cycles. A lower bound of T (t) given the limitation of available results for only up to 3 cycles is:

$$t = *Tc * \{1*P1 + 2*P2 + 3*P3 + 4*(1-P1-P2-P3)\},$$

which is an accurate estimate of T if the cumulative probability of receiving the payload within the first 3 cycles is close to 100% i.e. if (1-P1-P2-P3) is a small number. The estimate t assumes that all messages are received no later than during the $4^{th}$ cycle. The worse the performance is, i.e.

the higher (1-P1-P2-P3) is, T will be increasingly underestimated since then there is a non-zero probability that 5, 6, . . . cycles is necessary. Thus, poor performing scenarios may be giving overly optimistic results.

For example, the average number of cycles to read all messages for a 12 message payload subject to a WER=10% channel (Table 18) is:

| | | | |
|---|---|---|---|
| t = 1*0 | +2*0.0896 | +3*0.6970 | +4*(1−0.787) = 3.1 cycles (no coding) |
| t = 1*0 | +2*0.7992 | +3*0.1653 | +4*(1−0.965) = 2.2 cycles (1RS coding) |
| t = 1*0.0032 | +2*0.9801 | +3*0.0131 | +4*(1−0.995) = 2.0 cycles (2RS coding) |

Thus, including 2 frames of RS-coding can reduce the average time to acquire all messages from about 3.1 cycles to 2.0 cycles. Because the no-coding case has more optimistic performance (the assumption about no more than 4 cycles is needed) the difference in performance between the non-coding and the coding scenarios in reality may be somewhat bigger. The estimate t may not be relevant for the no-coding case and 20% WER for the same message length since (1-P1-P2-P3) is so high. For these conditions, the improvement of channel coding may be even larger, and in some cases much larger, than in the example shown above but is not fairly represented by using the estimate t. Results for more than 3 cycles may need to be available to determine the performance.

TABLE 12 extracts from Tables 6, 8 and 10
Probability (%) of correct received L3 message within a given number of cycles vs. L2 WER (22 L2 frames). 0, 1 and 2 RS frames coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 35.9 | 71.7 | 90.5 | 12.2 | 36.5 | 62.0 | 1.2 | 5.8 | 15.5 | 0.004 | 0.03 | 0.2 |
| 2 | 59.3 | 28.2 | 9.5 | 69.6 | 61.7 | 37.9 | 43.1 | 73.8 | 79.0 | 3.1 | 12.8 | 29.2 |
| 3 | 4.6 | 0.08 | 0.001 | 16.2 | 1.55 | 0.11 | 38.3 | 18.8 | 5.3 | 23.6 | 47.86 | 47.2 |

TABLE 13 extracts from Tables 7, 9 and 11
Probability (%) of correct received L3 message after a given number of cycles vs. L2 WER (20 L2 frames). 0, 1 and 2 RS frames coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 35.9 | 71.7 | 90.5 | 12.2 | 36.5 | 62.0 | 1.2 | 5.8 | 15.5 | 0.004 | 0.03 | 0.2 |
| 2 | 95.1 | 99.9 | 100 | 81.8 | 98.1 | 99.9 | 44.2 | 79.6 | 92.3 | 3.1 | 12.9 | 29.3 |
| 3 | 99.8 | 99.9 | 100 | 98.0 | 99.7 | 99.7 | 82.5 | 98.3 | 99.7 | 26.6 | 60.7 | 76.5 |

TABLE 14

4 messages
Probability (%) of 4 correct received L3 message within a given cycle vs. L2 WER (20 net L2 frames). 0, 1 and 2 RS frames coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 1.65 | 26.44 | 67.14 | 0.02 | 1.77 | 14.78 | ≈0 | ≈0 | 0.06 | ≈0 | ≈0 | ≈0 |
| 2 | 80.21 | 73.09 | 32.86 | 44.73 | 91.03 | 84.66 | 3.82 | 40.07 | 79.39 | ≈0 | 0.03 | 0.74 |
| 3 | 17.14 | 0.32 | 0.01 | 47.56 | 6.00 | 0.44 | 42.42 | 53.38 | 19.44 | 0.50 | 13.56 | 33.53 |

TABLE 15 cumulative probabilities, 4 messages
Probability (%) of 4 correct received L3 message after a given number of cycles
vs. L2 WER (20 net L2 frames). 0, 1 and 2 RS frames of coding

|  | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 1.65 | 26.4 | 67.1 | 0.02 | 1.8 | 14.8 | 0 | 0 | 0 | 0 | 0 | 0 |
| 2 | 81.9 | 99.5 | 100 | 44.8 | 92.8 | 99.4 | 3.8 | 40.1 | 79.5 | 0 | 0 | 0.74 |
| 3 | 99.0 | 99.9 | 100 | 92.3 | 98.8 | 99.9 | 46.2 | 93.5 | 98.9 | 0.5 | 13.6 | 34.3 |

TABLE 16

8 messages
Probability (%) of 8 correct received L3 message within a given
cycle vs. L2 WER (20 net L2 frames). 0, 1 and 2 RS frames coding

|  | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 0.03 | 6.98 | 45.08 | ≈0 | 0.03 | 2.18 | ≈0 | ≈0 | ≈0 | ≈0 | ≈0 | ≈0 |
| 2 | 66.99 | 92.06 | 54.92 | 20.03 | 86.09 | 96.70 | 0.15 | 16.05 | 63.12 | ≈0 | ≈0 | ≈0 |
| 3 | 31.00 | 0.64 | 0.01 | 65.19 | 11.50 | 0.87 | 21.23 | 71.27 | 34.67 | .0025 | 1.85 | 11.74 |

TABLE 17

17 cumulative probabilities, 8 messages
Probability (%) of 8 correct received L3 message after a given number
of cycles vs. L2 WER (20 net L2 frames). 0, 1 and 2 RS frames of coding

|  | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 0.03 | 7.0 | 45.1 | 0 | 0.03 | 2.2 | 0 | 0 | 0 | 0 | 0 | 0 |
| 2 | 67.0 | 99.0 | 100 | 20.0 | 86.1 | 98.9 | 0.2 | 16.1 | 63.1 | 0 | 0 | 0.01 |
| 3 | 98.0 | 99.7 | 100 | 85.2 | 97.6 | 99.8 | 21.4 | 87.3 | 97.8 | 0 | 1.9 | 11.8 |

TABLE 18

12 messages
Probability (%) of 12 correct received L3 message within a given
cycle vs. L2 WER (20 net L2 frames). 0, 1 and 2 RS frames coding

|  | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | ≈0 | 1.85 | 30.26 | ≈0 | ≈0 | 0.32 | ≈0 | ≈0 | ≈0 | ≈0 | ≈0 | ≈0 |
| 2 | 54.86 | 96.72 | 69.74 | 8.96 | 79.92 | 98.01 | 0.01 | 6.43 | 50.14 | ≈0 | ≈0 | ≈0 |
| 3 | 42.18 | 0.95 | 0.02 | 69.70 | 16.53 | 1.31 | 9.88 | 75.17 | 46.55 | ≈0 | 0.25 | 4.02 |

TABLE 19 cumulative probabilities, 12 messages
Probability (%) of 12 correct received L3 message after a given number
of cycles vs. L2 WER (20 net L2 frames). 0, 1 and 2 RS frames of coding

|  | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 0 | 1.9 | 30.3 | 0 | 0 | 0.3 | 0 | 0 | 0 | 0 | 0 | 0 |
| 2 | 54.9 | 98.6 | 100 | 9.0 | 79.9 | 98.3 | 0.01 | 6.4 | 50.1 | 0 | 0 | 0 |
| 3 | 97.0 | 99.5 | 100 | 78.7 | 96.5 | 99.5 | 9.9 | 81.6 | 96.7 | 0 | 0.3 | 4.0 |

TABLE 20

16 messages
Probability (%) of 16 correct received L3 message within a given
cycle vs. L2 WER (20 net L2 frames). 0, 1 and 2 RS frames coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | ≈0 | 0.49 | 20.32 | ≈0 | ≈0 | 0.05 | ≈0 | ≈0 | ≈0 | ≈0 | ≈0 | ≈0 |
| 2 | 44.91 | 97.61 | 79.68 | 4.0 | 74.17 | 97.74 | ≈0 | 2.58 | 39.84 | ≈0 | ≈0 | ≈0 |
| 3 | 51.16 | 1.26 | 0.02 | 68.61 | 21.13 | 1.74 | 4.57 | 73.68 | 55.78 | ≈0 | 0.03 | 1.38 |

TABLE 21 cumulative probabilities, 16 messages
Probability (%) of 16 correct received L3 message after a given number
of cycles vs. L2 WER (20 net L2 frames). 0, 1 and 2 RS frames of coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 0 | 0.5 | 20.3 | 0 | 0 | 0.05 | 0 | 0 | 0 | 0 | 0 | 0 |
| 2 | 44.9 | 98.1 | 99.9 | 4.0 | 74.2 | 97.8 | 0 | 2.6 | 39.8 | 0 | 0 | 0 |
| 3 | 96.1 | 99.3 | 100 | 72.6 | 95.3 | 99.5 | 4.6 | 75.3 | 95.6 | 0 | 0.03 | 1.4 |

TABLE 22

20 messages
Probability (%) of 20 correct received L3 message within a given
cycle vs. L2 WER (20 net L2 frames). 0, 1 and 2 RS frames coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | ≈0 | 0.13 | 13.64 | ≈0 | ≈0 | 0.01 | ≈0 | ≈0 | ≈0 | ≈0 | ≈0 | ≈0 |
| 2 | 36.77 | 97.50 | 86.36 | 1.79 | 68.83 | 97.23 | ≈0 | 1.03 | 31.65 | ≈0 | ≈0 | ≈0 |
| 3 | 58.35 | 1.58 | 0.03 | 65.24 | 25.33 | 2.16 | 2.11 | 70.23 | 62.92 | ≈0 | .0005 | 0.47 |

TABLE 23 cumulative probabilities, 20 messages
Probability (%) of 20 correct received L3 message after a given number
of cycles vs. L2 WER (20 net L2 frames). 0, 1 and 2 RS frames of coding

| | 5% | | | 10% | | | 20% | | | 40% | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | 0 | 0.1 | 13.6 | 0 | 0 | 0.01 | 0 | 0 | 0 | 0 | 0 | 0 |
| 2 | 36.8 | 97.6 | 100 | 1.8 | 68.9 | 97.2 | 0 | 1.0 | 31.7 | 0 | 0 | 0 |
| 3 | 95.1 | 99.2 | 100 | 67.0 | 94.1 | 99.4 | 2.1 | 71.2 | 94.6 | 0 | 0 | 0.5 |

TABLE 24

32, 64, 128 and 256 messages, WER = 10%
Probability (%) of 32, 64, . . . 256 correct received L3 message within a given
cycle vs. L2 WER (20 net L2 frames). 0, 1 and 2 RS frames coding. WER = 10%

| | 32 | | | 64 | | | 128 | | | 256 | | |
|---|---|---|---|---|---|---|---|---|---|---|---|---|
| cycles | 0 | 1 | 2 | 0 | 1 | 2 | 0 | 1 | 2 | 0 | 1 | 2 |
| 1 | ≈0 | ≈0 | ≈0 | ≈0 | ≈0 | ≈0 | ≈0 | ≈0 | ≈0 | ≈0 | ≈0 | ≈0 |
| 2 | 0.16 | 55.00 | 95.81 | ≈0 | 30.24 | 91.80 | ≈0 | 9.15 | 84.28 | ≈0 | 0.84 | 71.02 |
| 3 | 52.57 | 35.80 | 3.52 | 27.81 | 52.20 | 6.86 | 7.73 | 58.82 | 13.07 | 0.60 | 45.37 | 23.73 |

TABLE 25 cumulative probabilities, 32, 64, 128 and 256 messages, WER = 10%
Probability (%) of 32, 65, . . . correct received L3 message after a given number of
cycles vs. L2 WER (20 net L2 frames). 0,1 and 2 RS frames of coding. WER = 10%

|  | 32 | | | 64 | | | 128 | | | 256 | | |
| --- | --- | --- | --- | --- | --- | --- | --- | --- | --- | --- | --- | --- |
| cycles | 0 | 1 | 2 | 0 | 1 | 2 | 0 | 1 | 2 | 0 | 1 | 2 |
| 1 | 0 | 0 | 0 | 0 | 0 | 0 | 0 | 0 | 0 | 0 | 0 | 0 |
| 2 | 0.2 | 55.0 | 95.8 | 0 | 30.2 | 91.8 | 0 | 9.2 | 84.3 | 0 | 0.8 | 71.0 |
| 3 | 52.7 | 90.8 | 99.3 | 27.8 | 82.4 | 98.7 | 7.7 | 68.0 | 97.4 | 0.6 | 46.2 | 94.8 |

TABLE 26

32, 64, 128 and 256 messages, WER = 20%
Probability (%) of 32, 64, . . . 256 correct received L3 message within a given
cycle vs. L2 WER (20 net L2 frames). 0, 1 and 2 RS frames coding. WER = 20%

|  | 32 | | | 64 | | | 128 | | | 256 | | |
| --- | --- | --- | --- | --- | --- | --- | --- | --- | --- | --- | --- | --- |
| cycles | 0 | 1 | 2 | 0 | 1 | 2 | 0 | 1 | 2 | 0 | 1 | 2 |
| 1 | ≈0 | ≈0 | ≈0 | ≈0 | ≈0 | ≈0 | ≈0 | ≈0 | ≈0 | ≈0 | ≈0 | ≈0 |
| 2 | ≈0 | 0.07 | 15.88 | ≈0 | ≈0 | 2.52 | ≈0 | ≈0 | ≈0 | ≈0 | ≈0 | ≈0 |
| 3 | 0.24 | 58.09 | 75.72 | ≈0 | 33.82 | 81.39 | ≈0 | 11.44 | 70.35 | ≈0 | 1.31 | 49.58 |

Scheduling of Broadcast Messages

It has been shown that the ability to store the correct received data and wait for the non-correct received data in the following cycle can improve the performance substantially, see for example Table 15. The method of multiple chances to read a message may only be generally applicable if the content is constant over the cycles. For example, if higher layer coding is applied, the redundancy can only be used to correct errors for information that generated the redundancy. Thus, a wireless terminal may not be able to store the correct frames and in the subsequent cycles fetch further frames until N−K correct frames are received and then apply channel decoding as described above if the content has changed between the cycles.

The wireless terminal is typically informed that the content has changed through some form of change notification. Thus, one strategy is to store the correct received data and if the next cycle has not enabled the change indicator, the process of gathering data from multiple cycles can be used. For service with infrequent change, for example the data base for IR, this may not be a problem. For these kinds of services, ANSI 136 supports a change indicator (in addition to more detailed and service specific indicators) on the paging channel. Thus, whenever the system changes the broadcast content, the wireless terminals can be waked from the sleep-mode and read the BCCH. In ANSI 136, two indicators are provided in the paging slot, one for F-BCCH and E-BCCH and one specific for S-BCCH i.e. the broadcast channel.

However, not all services should be linked (trigger) the S-BCCH change flag in the paging slot. For a service where the underlying data is constantly changed, e.g. a stock quote service, a design choice when developing the protocol may be made. For frequently changing content, the change flag in the paging slot may not be enabled since this triggers activity of all mobiles interested in any S-BCCH data. For services which do not change content frequently, for example the IR service described above, the triggering of the change flag in the paging slot is feasible. For the services that are defined not to trigger the change flag in the paging slot, the wireless terminal may examine the descriptive part of the broadcast channel itself where it will find service category specific change information.

If the data is allowed to be changed from cycle to cycle, the wireless terminal may accept or reject the data for each cycle. With poor or even marginal radio channel conditions, the wireless terminal may never acquire any data since it is unable to recover all data during a single cycle. During the next cycle the wireless terminal gets another chance to decode the data but can typically not use the data from the previous cycle to improve the decoding performance. Since the calculation herein shows the power of allowing multiple chances to recover the data, although delaying the service, the present invention may repeat the data and include scheduling information to aid the wireless terminal's decoding performance.

Scheduling of messages assigned to various service types are known. For example, in U.S. Pat. No. 5,768,276 to Diachina et al., entitled "Digital Control Channels Having Logical Channels Supporting Broadcast SMS", the ANSI 136 BATS service and the enhanced GSM Cell Broadcast supports the aspect of informing a receiver when a message or set of messages will occur in time. The wireless terminal may be programmed (by the user) to only read certain service categories or types of messages. The wireless terminal may then omit reading data and thereby save battery drain, and start reading the Broadcast channel when the message(s) should appear according to the scheduling information. Scheduling according to the present invention can provide the wireless terminal with the following additional information:

1. for how many cycles the content will (minimum) stay constant.
2. the cycle sequence number of current cycle in the set of cycles of constant content.

Note that the sequence number in this context generally differs from the prior art. In the prior art a message or set of messages may be assigned a sequence number. The wireless terminal stores this number(s) and at the next reading compares the current number with the stored number. If they are equal, this is an indication that the message has the same contents. Thus, the use of sequence numbers in the prior art provides a change indication. The sequence number according to the proposed method is a cycle number which allows the wireless terminal to synchronize to the start of a set of cycles with constant contents. The receiver thereby knows the first, second, . . . , and the last cycle having common content. The aspect of change notification using a sequence number may also be useful in the present invention. However, they serve different purposes and both objectives may be supported. The cycle sequence number and the number of repeats effectively becomes a change notification with a time stamp when a (potential) change will occur.

By including the scheduling information as described above, the wireless terminal may be informed whether it is worthwhile to store content from current cycle when the message(s) could not be fully processed in the current cycle. For a stock quote or any other service with frequent change of content, the use of this method, i.e. repeat of entire content, may decrease the maximum possible throughput. Wireless terminals experiencing very good channel conditions may not be able to get updates as frequently as otherwise. However, it allows wireless terminals experiencing marginal or bad channel conditions to better receive the data, in effect increasing the throughput.

The system operator may determine the number of repeats. This value may be different for different service categories and/or types of information. The longer the set of messages which defines an application message, the more repeats should preferably be used. This value, specific for each service, may be sent in an overhead part of the broadcast message. Various locations (in the protocol) are possible. For example, it can be included in the BATS service which is defined to provide attributes to the payload.

In the following, an exemplary process describing a wireless terminal activity will be described. Many variations are possible. For example, it is not necessary to wait for the first cycle in order to read the data at power on.

1. The wireless terminal acquires information of which service categories, message types etc. for which the user is interested. This information may be found on a smart-card or entered into the memory by the user. To this end, each service or category may assigned a number, possibly in a hierarchical order for linked services. For example, sport-NFL has two numbers which are linked.

2. The wireless terminal finds the control channel at power on and reads the (Master) control channel.

3. If there are any other channels carrying broadcast services with local descriptive information about the services (e.g. BATS) then the channel assigned for call-set-up purposes, the wireless terminal reads the indicated (Slave) channel.

4. The wireless terminal uses the information in the descriptive part of the broadcast channel to determine
   which services presently coincide with the users request
   when in time the message(s) pertaining to this service will be transmitted
   acquires the number of repeats for each service.

5. The wireless terminal reads the first cycle of a service. If the number of transmissions is set to more then 1, the wireless terminal stores all frames which are indicated with high likelihood to be correctly received, typically by performing a CRC check. If redundancy is provided based on multiple such frames, the wireless terminal calculates whether it has sufficient amount of correct received data to perform a channel decoding to completely recover the message.

6. If the message(s) can be correctly decoded, the wireless terminal delivers the payload to the destination (e.g. a display, a companion device). The wireless terminal can omit reading the following cycle(s) according to current cycle sequence number and the number of cycle repeats. If the message(s) can not be correctly decoded, the wireless terminal only needs to read the missing frames in the next cycle. The wireless terminal again determines whether channel decoding is possible etc.

Coding Format For Higher Nominal Throughput

The performance improvement of higher layer coding can be tailored towards higher net bit-rate rather than improved CRM. For example, the rate of the inner convolutional code can be set to $5/6$ and the rate for the outer code to $3/4$ or higher. The improvement over current ANSI 136 in nominal net bit rate can be $(5/6)*(3/4)/(1/2) \approx 1.25$ i.e. 25% increase in payload per time unit. Another example is $5/6$ coding combined with 2RS frames which can further improve the net throughput: $(5/6)*(20/22)/(1/2) \approx 1.52$ i.e. 52% improvement. For this example, the reduction of the coding in Layer 2 may be fully compensated by the small amount of coding in Layer 3.

Assuming a pessimistic doubling in WER when going from rate $1/2$ to rate $5/6$ coding on the Layer 2 frames, the performance of the present ANSI 136 format can be compared with this exemplary format. In FIG. 32, the performance of no coding at 10% WER and 2RS coding at 20% WER can be compared. For 2 cycles, the CRMS performance of 2RS coding at 20% WER is about 50% whereas CRMS for no coding at 10% WER is about 9% (see arrow in FIG. 32). Thus, for 2 cycles, the alternative format shows better result. In addition, the throughput is 52% faster.

For 3 cycles the CRMS is 78 and 96% respectively, thus the alternative format again outperforms the reference format. For 3 cycles and assuming 20% WER for the reference format and hence 40% WER for the alternative format, the CRMS is 5 and 9% respectively, thus the alternative format is somewhat worse. However, the performance for both formats may be rather poor at these high WER conditions.

More than 3 Cycles may be Required.

For scenarios with lower WER, the alternative format may outperform the reference format in addition to its higher throughput. For higher WER, the alternative format will, during the same elapsed time, have transmitted the payload more times than for the reference format. For example, during the time that the reference format has transmitted 3 cycles, the alternative format has transmitted 3*1.5 or 4.5 cycles. The combined effect of the inclusion of a small amount of RS coding and the increased number of cycles for a given elapsed time will most likely outperform the reference format for all relevant conditions (WER, number of messages).

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of wirelessly broadcasting a message to a plurality of wireless terminals comprising the steps of:
   error correction coding the message to produce an error correction coded message block;
   dividing the error correction coded message block into a plurality of frames;
   error detection coding the frames to produce a plurality of error detection coded frames;
   error correction coding the error detection coded frames to produce a plurality of error detection and correction coded frames; and wirelessly broadcasting the plurality of error detection and correction coded frames to the plurality of wireless terminals.

2. A method according to claim 1 wherein the step of error correction coding the message comprises the step of block coding the message and wherein the step of error correction coding the error detection coded frames comprises the step of convolutionally coding the error detection coded frames.

3. A method according to claim 1 wherein the message is a layer 3 message and wherein the frames are layer 2 frames.

4. A method according to claim 1 wherein the step of error correction coding the message comprises the step of block coding the message, wherein the step of error correction coding the error detection coded frames comprises the step of convolutionally coding the error detection coded frames and wherein the step of error detection coding comprises the step of cyclic redundancy checking the frames to produce a plurality of cyclic redundancy checked frames including a cyclic redundancy check value.

5. A method according to claim 1 wherein the step of wirelessly broadcasting comprises the step of wirelessly broadcasting the plurality of error detection and correction coded frames to the plurality of radiotelephones over a broadcast channel.

6. A method according to claim 5 wherein the broadcast channel comprises a plurality of slots.

7. A method according to claim 1 wherein the step of wirelessly broadcasting is repeatedly performed with same content for a predetermined number of cycles, the method further comprising the step of providing at least one of an indication of the predetermined number of cycles and an identification of a current cycle number.

8. A method of wirelessly broadcasting a message to a plurality of wireless terminals comprising the steps of:

error correction coding the message to produce an error correction coded message block;

dividing the error correction coded message block into a plurality of frames;

error correction coding the frames to produce a plurality of error correction coded frames;

providing an indication that the error correction coded message block is error correction coded; and wirelessly broadcasting the plurality of error correction coded frames and the provided indication to the plurality of wireless terminals.

9. A method according to claim 8 wherein the step of providing an indication comprises the step providing an indication within the message block, that message block is error correction coded.

10. A method according to claim 8 wherein the step of providing an indication comprises the step providing an indication outside the message block, that message block is error correction coded.

11. A method according to claim 8 wherein the step of providing an indication further comprises the step of providing an indication of at least one of a type of error correction coding and an amount of error correction coding in the error correction coded message block.

12. A method of wirelessly receiving a message at a wireless terminal comprising the steps of:

wirelessly receiving a plurality of frames;

error correction decoding the frames to produce a plurality of error correction decoded frames;

error detection decoding the error correction decoded frames to produce a plurality of error detection decoded frames;

providing an indication of the result of the error detection decoding step;

combining the plurality of error detection decoded frames into a message block; and error correction decoding the message block to produce the message.

13. A method according to claim 12 wherein the step of error correction decoding the message block comprises the step of block decoding the message block and wherein the step of error correction decoding the frames comprises the step of convolutionally decoding the frames.

14. A method according to claim 12 wherein the message block is a layer 3 message block and wherein the frames are layer 2 frames.

15. A method according to claim 12 wherein the step of error correction decoding the message block comprises the step of block decoding the message block, wherein the step of error correction decoding the frames comprises the step of convolutionally decoding the frames and wherein the step of error detection decoding comprises the step of cyclic redundancy checking the frames to produce a plurality of cyclic redundancy checked frames including a cyclic redundancy check value that indicates whether the cyclic redundancy check detected an error.

16. A method according to claim 12 wherein the step of wirelessly receiving comprises the step of wirelessly receiving the plurality of frames over a broadcast channel.

17. A method according to claim 16 wherein the broadcast channel comprises a plurality of slots.

18. A method according to claim 12 wherein the step of wirelessly receiving is repeatedly performed with same content for a predetermined number of cycles, the method further comprising the step of receiving at least one of an indication of the predetermined number of cycles and an identification of a current cycle number and wherein the step of wirelessly receiving is repeatedly performed based upon the received at least one of an indication of the predetermined number of cycles and an identification of a current cycle number.

19. A method according to claim 12 wherein the step of error correction decoding is followed by the step of generating a quality indicator for the wirelessly receiving method.

20. A method according to claim 12 further comprising the step of generating a quality indicator for the wirelessly receiving method based on the indication of the result of the error detection decoding step.

21. A method of wirelessly receiving a message at a wireless terminal comprising the steps of:

wirelessly receiving a plurality of frames; error correction decoding the frames to produce a plurality of error correction decoded frames;

combining the plurality of error correction decoded frames into a message block; and error correction decoding the message block to produce the message in response to an indication that the message block is error correction coded.

22. A method according to claim 21 wherein the indication is provided within the message block, that the message block is error correction coded.

23. A method according to claim 21 wherein the indication is provided outside the message block, that the message block is error correction coded.

24. A method according to claim 21 further comprising the step of receiving an indication of at least one of a type of error correction coding and an amount of error correction coding in the message block, and wherein the step of error correction decoding the message block comprises the step of error correction decoding the message block according to the received indication.

25. A method of wirelessly transmitting information comprising the steps of:
   error correction coding the message to produce an error correction coded information block;
   dividing the error correction coded information block into a plurality of segments;
   error detection coding the segments to produce a plurality of error detection coded segments;
   error correction coding the error detection coded segments to produce a plurality of error detection and correction coded segments; and
   wirelessly transmitting the plurality of error detection and correction coded segments.

26. A method according to claim 25 wherein the step of error correction coding the information comprises the step of block coding the information and wherein the step of error correction coding the error detection coded segments comprises the step of convolutionally coding the error detection coded segments.

27. A method according to claim 25 wherein the step of error correction coding the information comprises the step of block coding the information, wherein the step of error correction coding the error detection coded segments comprises the step of convolutionally coding the error detection coded segments and wherein the step of error detection coding comprises the step of cyclic redundancy checking the segments to produce a plurality of cyclic redundancy checked segments.

28. A method according to claim 25 wherein the step of wirelessly transmitting is repeatedly performed with same content for a predetermined number of cycles, the method further comprising the step of providing at least one of an indication of the predetermined number of cycles and an identification of a current cycle number.

29. A method of wirelessly transmitting information comprising the steps of:
   error correction coding the message to produce an error correction coded information block;
   dividing the error correction coded information block into a plurality of segments;
   error correction coding the segments to produce a plurality of error correction coded segments;
   providing an indication that the information block is error correction coded; and
   wirelessly transmitting the plurality of error correction coded segments and the provided indication.

30. A method according to claim 29 wherein the step of providing an indication comprises the step providing an indication within the information block that the error correction coded information block is error correction coded.

31. A method according to claim 29 wherein the step of providing an indication comprises the step providing an indication outside the error correction coded information block, that the information block is error correction coded.

32. A method according to claim 29 wherein the step of providing an indication further comprises the step of providing an indication of at least one of a type of error correction coding and an amount of error correction coding in the error correction coded information block.

33. A method of wirelessly receiving information at a wireless terminal comprising the steps of:
   wirelessly receiving a plurality of segments;
   error correction decoding the segments to produce a plurality of error correction decoded segments;
   error detection decoding the error correction decoded segments to produce a plurality of error detection decoded segments;
   providing an indication of the result of the error detection decoding step to the combining step;
   combining the plurality of error detection decoded segments into an information block; and
   error correction decoding the information block to produce the information.

34. A method according to claim 33 wherein the step of error correction decoding the information block comprises the step of block decoding the information block and wherein the step of error correction decoding the segments comprises the step of convolutionally decoding the segments.

35. A method according to claim 33 wherein the step of error correction decoding the information block comprises the step of block decoding the message block, wherein the step of error correction decoding the segments comprises the step of convolutionally decoding the segments and wherein the step of error detection decoding comprises the step of cyclic redundancy checking the segments to produce a plurality of cyclic redundancy checked segments including a cyclic redundancy check value that indicates whether the cyclic redundancy check detected an error.

36. A method according to claim 33 wherein the step of wirelessly receiving is repeatedly performed with same content for a predetermined number of cycles, the method further comprising the step of receiving at least one of an indication of the predetermined number of cycles and an identification of a current cycle number and wherein the step of wirelessly repeating is repeatedly performed based upon the received at least one of an indication of the predetermined number of cycles and an identification of a current cycle number.

37. A method according to claim 33 wherein the step of error correction decoding is followed by the step of generating a quality indicator for the wirelessly receiving method.

38. A method of wirelessly receiving information at a wireless terminal comprising the steps of:
   wirelessly receiving a plurality of segments;
   error correction decoding the segments to produce a plurality of error correction decoded segments;
   combining the plurality of error correction decoded segments into an information block; and
   error correction decoding the information block to produce the information in response to an indication that the information block is error correction coded.

39. A method according to claim 38 wherein the indication is provided within the information block, that the information block is error correction coded.

40. A method according to claim 38 wherein the indication is provided outside the information block, that the information block is error correction coded.

41. A method according to claim 38 further comprising the step of receiving an indication of at least one of a type of error correction coding and an amount of error correction coding in the information block, and wherein the step of error correction decoding the information block comprises the step of error correction decoding the information block according to the received indication.

42. A base station that broadcasts a message to a plurality of wireless terminals, the base station comprising:
   means for error correction coding the message to produce an error correction coded message block;

means for dividing the error correction coded message block into a plurality of frames;

means for error detection coding the frames to produce a plurality of error detection coded frames;

means for error correction coding the error detection coded frames to produce a plurality of error detection and correction coded frames; and means for wirelessly broadcasting the plurality of error detection and correction coded frames to the plurality of radiotelephones.

43. A wireless terminal comprising:

means for wirelessly receiving a plurality of frames;

means for error correction decoding the frames to produce a plurality of error correction decoded frames;

means for error detection decoding the error correction decoded frames to produce a plurality of error detection decoded frames;

means for providing an indication of the result of the error detection decoding step to the combining step;

means for combining the plurality of error detection decoded frames into a message block; and means for error correction decoding the message block to produce a message.

\* \* \* \* \*